United States Patent [19]

Allegrezza

[11] Patent Number: 5,689,624
[45] Date of Patent: Nov. 18, 1997

[54] STOCHASTIC BASED INCREASED TONAL RANGE FLEXOGRAPHIC SCREENING PROCESS AND APPARATUS

[76] Inventor: John M. Allegrezza, 1503 Potters Pl., Holland, Pa. 18966

[21] Appl. No.: 398,159

[22] Filed: Mar. 3, 1995

[51] Int. Cl.$^6$ .................................................. G06K 15/00
[52] U.S. Cl. ........................................... 395/112; 395/101
[58] Field of Search ................................. 395/112, 109, 395/101, 103, 104, 114, 131, 133, 134, 500; 358/296, 298, 456, 455, 459, 536, 534, 535, 429; 347/142, 14, 133, 236, 246, 189, 194, 19

[56] References Cited

U.S. PATENT DOCUMENTS

| | | | |
|---|---|---|---|
| 5,109,282 | 4/1992 | Peli | 358/298 |
| 5,185,673 | 2/1993 | Sobol | 358/296 |
| 5,295,236 | 3/1994 | Bjorge et al. | 395/134 |
| 5,416,890 | 5/1995 | Beretta | 395/131 |
| 5,500,744 | 3/1996 | Sabath | 358/456 |
| 5,528,377 | 6/1996 | Hutcheson | 358/298 |
| 5,542,052 | 7/1996 | Deutsch et al. | 395/131 |
| 5,548,407 | 8/1996 | Von Kienlin et al. | 358/298 |

OTHER PUBLICATIONS

Dupont Digital Proofer Product Guide, E.I. DuPont Co., Wilmington, DE, p. 6, Jun. 1994.

Dupont EX 3100 Digital Proofer Pre–Installation Manual, pp. 2, 4 and 19, Jul. 1994.

Mount–O–Matic brochure, AV Flexologic, Holland, Feb. 1994.

Crosfield C6000 Color Scanner Product Guide, Product Guide, Crosfield Electronics, Ltd., Hertfordshire, England, pp. 20–24, Oct. 1994.

Magnasetter 2000 brochure, Crosfield Electronics, Ltd, 3 pages, Sep. 1994.

Cyrel Flexo Optimization System brochure, DuPont De Nemours AG, Frankfurt, Germany, 5 pages, Mar. 1994 (date not definite).

Paper: "Quality excellence in pre–press", Ian Hole, 3rd Int'l Flexographic Conference, Birmingham, England, Feb. 14–16, 1994.

Proceedings: "Narrow Web Flexo Printing With UV Inks", David Argent, et al., pp. 159–183, 3rd Int'l Flexographic Conference, Birmingham, England, Feb. 14–16, 1994.

*Primary Examiner*—Edward L. Coles, Sr.
*Assistant Examiner*—Dov Popovici
*Attorney, Agent, or Firm*—John J. Simkanich

[57] ABSTRACT

A screening process and apparatus for flexographic printing press control is implemented in hardware and computer software to provide increased tonal range output at the press thereby providing enhanced direct press control, without adjustment based on press output. The image data from a desktop publisher is processed through a software resident interpreter which translates that data pursuant to a pre-developed enhanced language. This interpreter language has been is generated from imperially predetermined image setter and press factors and a stochastically based tone area algorithm. Calibration factors selected as a function of the image setter and press equipment being controlled are input to modify the interpreter language generated.

20 Claims, 5 Drawing Sheets

DOT SHAPE

TYPICAL PATTERN WITH INVERSE AFTER 50%

15%  30%  45%  49%  51%  65%  70%  85%

CLUSTER DOT CONSTRUCTION

| CLUSTERED DOT OF 4 PIXELS | CLUSTERED DOT OF 8 PIXELS | CLUSTERED DOT OF 11 PIXELS | CLUSTERED DOT OF 16 PIXELS | CLUSTERED DOT OF 16 PIXELS |

OPENESS DOT STRUCTURE

0%    30%    70%    90%

PROCESSING TONAL RANGE OF
SCREENING CAPABILITY OF PRIOR ART

PROCESSING TONAL RANGE OF
SCREENING CAPABILITY OF THE INVENTION

STOCHASTIC BASED INCREASED TONAL RANGE FLEXOGRAPHIC SCREENING PROCESS AND APPARATUS

BACKGROUND OF THE INVENTION

The present invention is directed to a process and apparatus for controlling the operation of a flexographic press, directly, without adjustment based on press output. This process includes FM (frequency modulated) screening.

Flexography is relief printing with plates fastened to a rotating cylinder, usually with a single inking roller supplied with an aniline ink from other rollers in an ink fountain. Screening is the process of controlling the ink application to the plate to control the image definition provided at the press output. Controlling the image definition is controlling the image tonal qualities.

Modern flexographic printing has been computerized. The image to be printed is often developed and laid out on a desk top computer system which creates the data for printing. This has become known as desktop publishing. Desk top publishing image output data has been standardized in 8 bit words (bytes). Thus, the tone definition for each pixel (unit picture area) is defined in any of 256 values (from 0 to 255) at the output of the desktop publisher.

The flexographic printer operation has also become computerized. A press function and operation input computer, known as an image setter, is used to provide control signals which operate the press itself from the desktop image data provided to it.

Computerized flexographic screening is the input of gray data, tone quality information, to the press (image setter). However, screening accuracy, based on desktop image data has been a problem because the press operations, specifically, the press electronic signal gain control has been difficult to predict. The translation of direct desktop image data into press operation signals has provided press output errors, generally in the 30 percent range, including blooming and ink over run. This problem has been the focus of much research for sometime.

An initial approach to this problem has been to reduce the sensitivity of the press, i.e. to reduce the tonal range by electronically dampening gain. This reduces errors, i.e. increases image accuracy, but reduces tonal quality. As an example, in order to obtain the desired accuracy, the 256 tone values available at the desktop may have to be reduced to 100 tone values at the press.

Initially, this press gain and therefore tone adjustment was done manually, by trial and error, for every printing run. This adjustment included, either modifying the input signal to the press image setter or disregarding certain signal values, until the press output accuracy was satisfactory. A printer output scanner feedback system has been developed to automate this manual trial and error adjustment. This system includes a densitometer, which is a print result scanner, to provide a feedback signal to a press input data processor. This press input data processor is an intermediate controller inserted between the desktop output and the press image setter input. The goal of the system is to increase tone quality at the press output, including gray balance, dot grain characteristics and contact characteristics, by real time feedback control adjustment of the press input signals. It includes digital filtering of image data in the intermediate processor to electronically dampen press input signals. Such dampening of necessity must reduce press output tonal range below that provided by the desktop publisher.

Others have attempted to increase flexo-press tone quality: by varying dot percentage as a function of dot size; by varying dot shape; by defining dot pattern stochastically (based on random or quasi-random variables); by varying press ink densities and ink chemistry including water based and U.V. inks; by controlling press ink roll volumes; and by studying curvature effects and gravimetric results of ink transfer.

It is desirable to provide an improved electronic control of flexo-press input signals which will yield enhanced flexo-press tonal performance while maintaining acceptable image accuracies (in the 3 percent error range), without modifying the flexo-press itself, or its inks, or its image setter, and without the use of feedback control or other real time compensation.

SUMMARY OF THE INVENTION

An objective of the present invention is to provide a desktop printer image signal processor apparatus for flexographic press screening which yields increased tonal range press output.

A second objective is to provide a flexographic screening process which yields increased tonal range press output while maintaining acceptable image accuracy.

A further objective is to provide this process and apparatus which will directly translate desktop image data into flexo-press input signals (data) without the need for off-line press output monitoring and adjustment, or the need for real-time press output monitoring and feedback control.

The objectives of this invention are realized in a process and an apparatus for implementing that process which compensates for flexo-press gain by increasing the sensitivity of the desktop image data as opposed to decreasing the sensitivity of the flexo-press. In a digital environment, sensitivity equates to the number of bits or number of values. Therefore, the present invention overcomes existing flexo-press gain by increasing the value "set" for the image data provided by the desktop publishing computer from 256 to 1000×"n". This is implemented in a software driven interpreter process and its apparatus.

A process for FM screening is software and hardware implemented to generate a interpreter language specific to the image setter and flexographic press being used and to any ambient factors selectively input. Desktop image data is then translated, pixel by pixel, into interpreted data sent to the flexo-press image setter.

The process is implemented with a calibration interface circuit connected to the desktop computer output for receiving flexo-press selection information and to a peripheral input device for receiving ambient factors. The calibration interface output as well as the desktop computer image data output are connected to a processor unit containing interpreter software. A separate high capacity hard drive dedicated to holding compressed language data is connected to the processor unit. The processor unit output connects to the flexo-press image setter input.

The interpreter software generates a language of 1000× "n" words specific to the particular immediate application. Each word in the language defines a different "tile". A tile is a unit area (pixel) pattern. Interpreter translation substitutes tiles for pixel image data values. Input and output buffer registers may be used. The translator steps are carried on iteratively until all of the image data is interpreted.

DESCRIPTION OF THE DRAWINGS

The features, advantages and operation of the animal toy of the present invention will become readily apparent and further understood from a reading of the following detailed description with the accompanying drawings, in which like numerals refer to like elements, and in which.

DETAILED DESCRIPTION OF THE INVENTION

The present invention is a process, and the apparatus for the implementation of the process, of interpreting desktop publisher image data, in 8 bit format of values "0" to "255", of gray scale printing information into an expanded language set of 1000 times "n" values of information. The process and apparatus are applied to flexographic printing screening (input of gray/tone data to press) technology implementation.

The invention includes software screen technology capable of producing first and second order frequency modulated (FM) screens. Cluster dot formation is used to ensure high edge quality and a large number of screening patterns. Screening tonal range is increased through the use of dot gain correction. This dot gain correction is implemented in calibrated interpreter functions whereof the translation is specific to the flexo-press used and any ambient factors considered.

Figure 1:
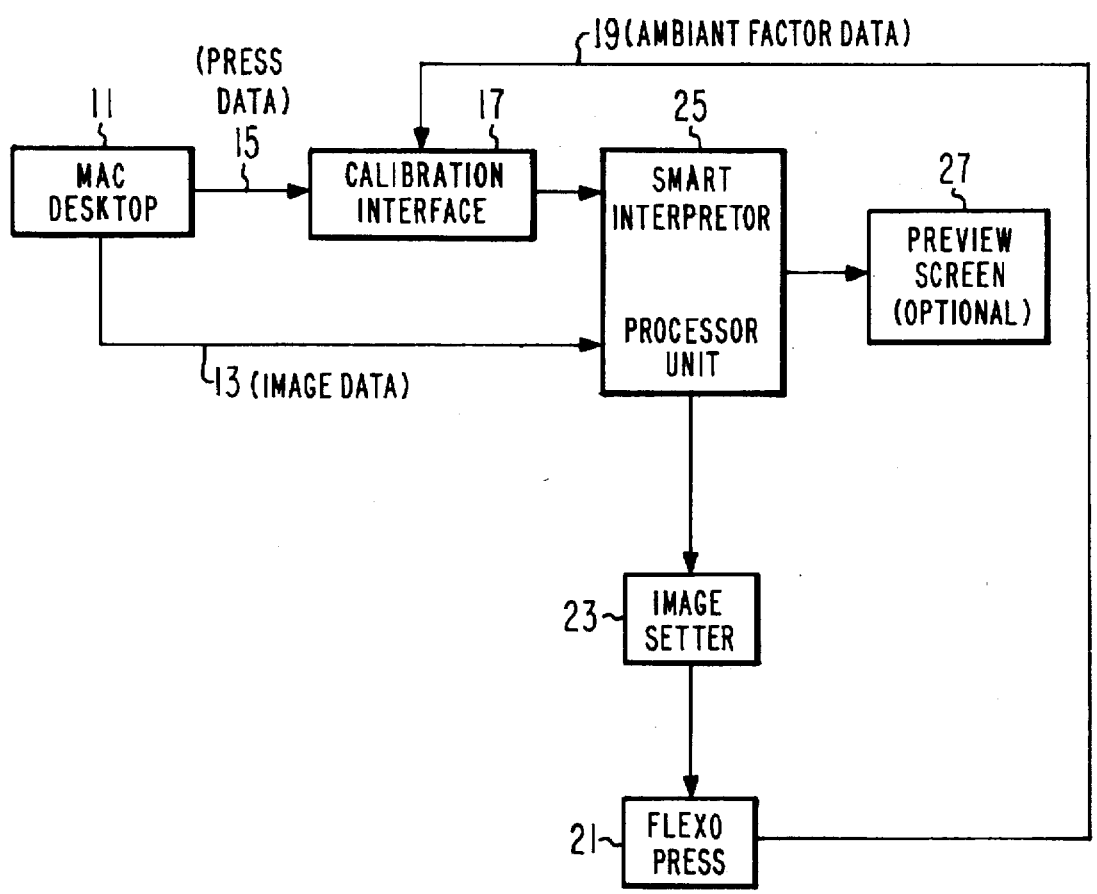
FIG. 1 is a block diagram of the apparatus used to implement the invention and its connection between a desktop publishing computer and a flexo-press image setter.

A desktop publisher 11, FIG. 1, implemented by a PC type processor, such as a Macintosh Quata 800, provides flexo-press image data 13 in 8 bit (256 value format). Flexo-press equipment selection data 15 is also provided by the desktop publisher 11.

A calibration interface circuit 17 is connected to receive the selection data 15. This calibration circuit is also connected to receive ambient factor data 19 from a flexographic press 21. The flexographic press 21 can be implemented with any of the commercially available narrow web or wide web presses, such as a Comco International, Inc., of Milford Ohio, "FLEXOPACK" model. The ambient factor data 19 can be obtained from various signal sources, well known in the industry, such as outputs from meters, gauges and sensors. The press 21 operation is controlled by an image setter 23. This image setter is any of those commercially available in the market place, such as a Crossfield Electronics Ltd, of Hempstead, Herfordshire, England, model "MS 2000". Image setter 23 ambient factor data 19 is also received by the calibration interface circuit 17.

Calibration interface circuit 17 contains software shown in "C" language as Appendix "A". This software defines and controls the interface 17 calibration operation and functions. The process carried out by this software (Appendix A) will be discussed further below.

A processor unit 25 contains a CPU and a storage device such a hard disk drive. This processor contains software which defines and controls its operation. A first program shown in Appendix "B" in "C" language carries out the generation of a base word "tile" generation for the interpreter's language, and data for generating a specific interpreter language set to perform the specific tonal range gray data contemplated (screening contemplated). An optional preview display screen may be connected to the processor unit 25.

The output of the calibration interface circuit is connected to the processor unit 25. The image data 13 from the desktop publisher 11 is sent to the processor though a separate connection.

Figure 2:
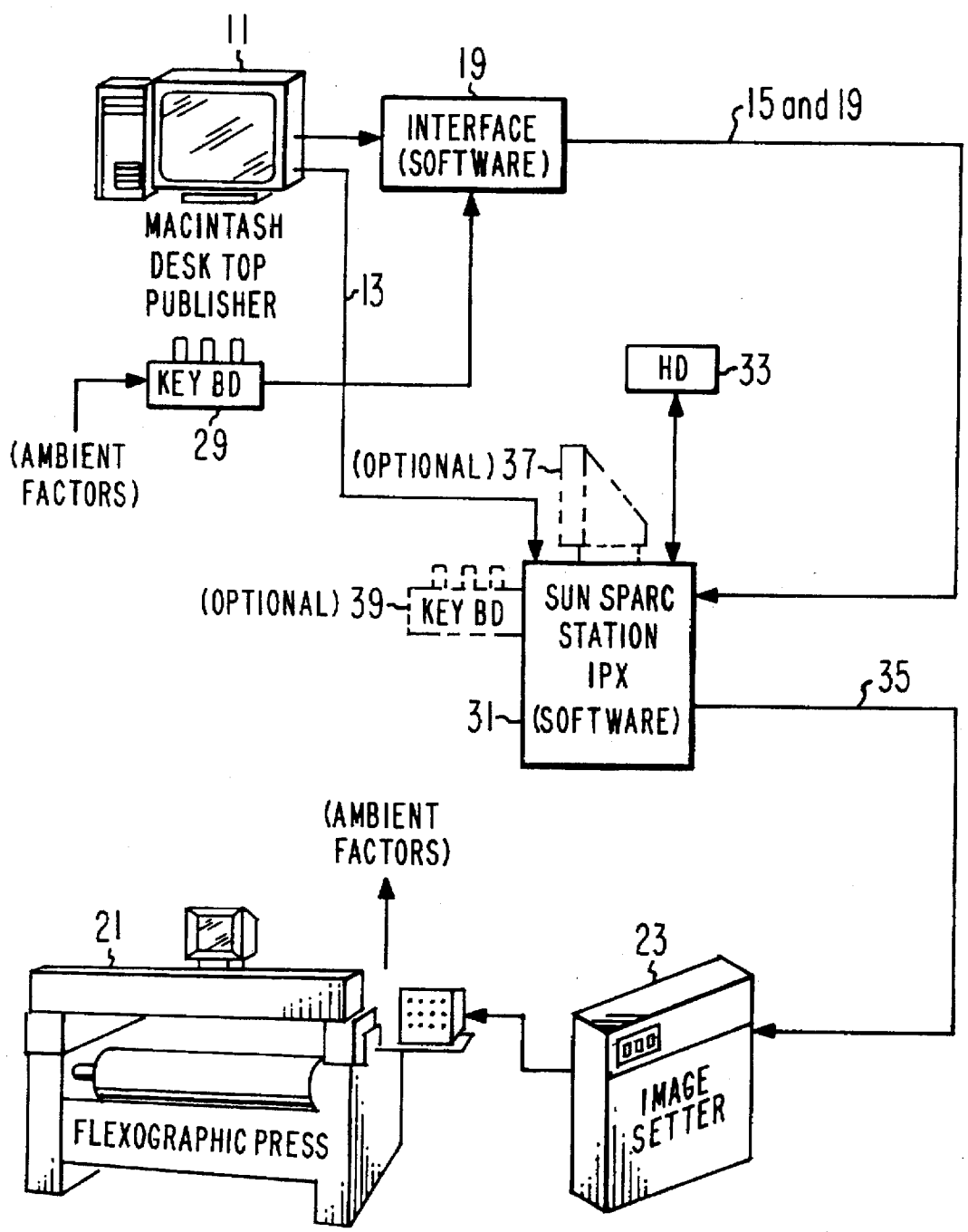
FIG. 2 is an alternate block diagram implementation of the invention apparatus of FIG. 1.

The Macintosh desktop publisher 11, FIG. 2, has the interface circuit 17 implemented as an internal storage register within its mainframe. The press data 15 and ambient factors 19 are loaded into this calibration interface storage register by the Macintosh 11 keyboard 29. The software program of Appendix A is operated by the Macintosh 11 CPU. A previously used screening station 31 is modified to operate as the processor unit 25. This screening station can be selected from any of those commercially available, including a Sun Microelectronics, Sunnyvale, Calif., model "SPARC STATION" IPX which contains a UNIX based CPU. This Sun unit 31 contains insufficient memory storage. Thus an external hard drive 33 is connected to an appropriate port of the Sun unit 31. The interpreter base tile (word) and the tile information for building a tile library or language is held in compressed format in the hard drive 33. Appendix "B" shows a memory map for the data held in hard drive 33. This data of Appendix B is in binary, hex form.

The software for performing the generation of the base tile data held in hard drive 33 is contained in the main memory of the Sun unit 31. This Sun unit 31 contains the software program shown as Appendix "C". This program generates a specific language specific to flexo-press selection, ambient factor input and uses this language to translate image data 13, defined from the desktop publisher 11 in a 255 value gray scale, into image setter data in a 1000 value gray scale.

The Sun unit 31 may also have connected a dedicated optional monitor 37 and keyboard 39. FIG. 2 maintains the data 13, 15 and 19 connections into the Sun unit 31 discussed in connection to FIG. 1. The Sun unit 31 output is connected to the input of the image setter 23 to carry the data 35. Image setter 23 is connected to operate and/or drive the press 21.

Figure 3:
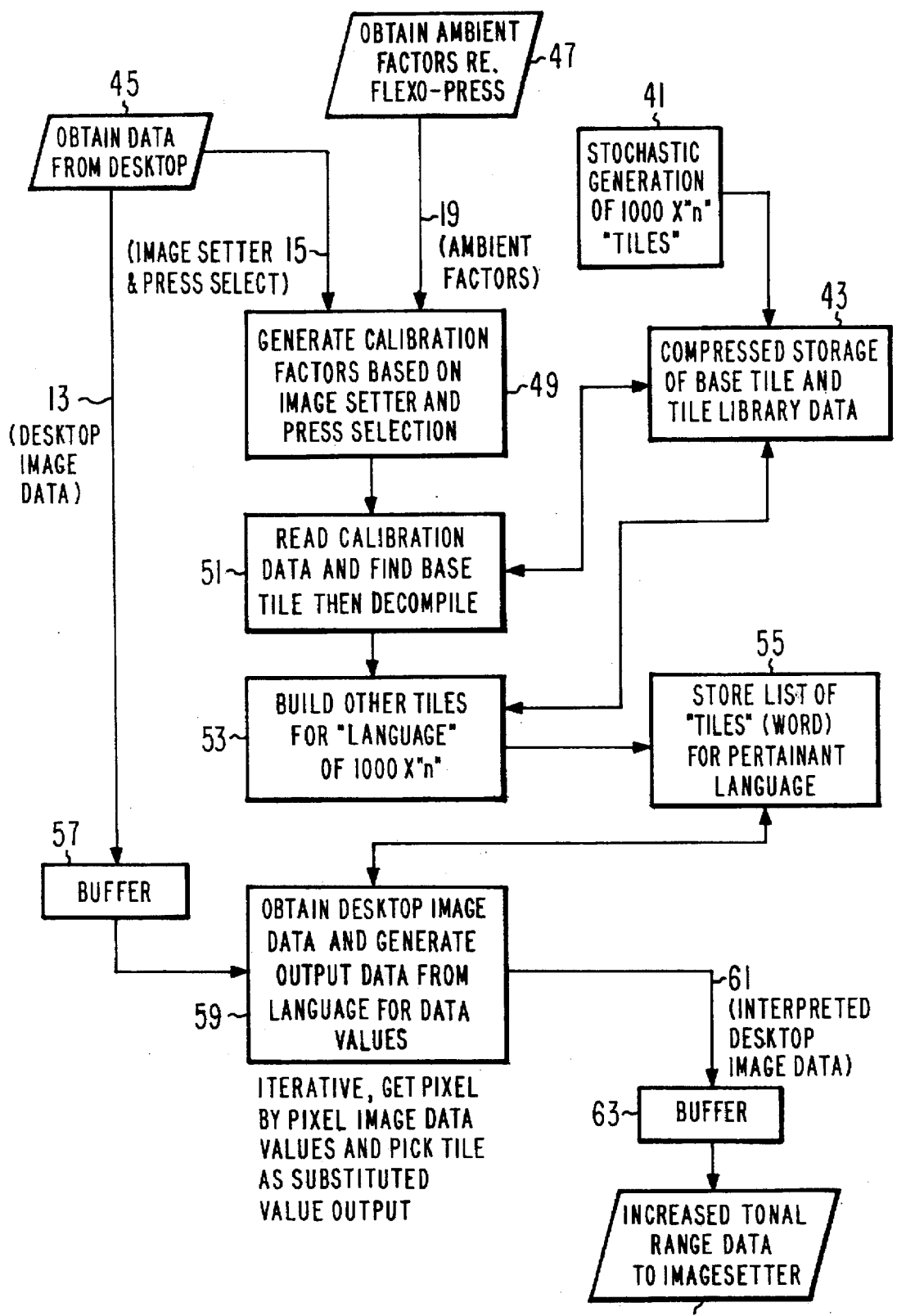
FIG. 3 shows the process steps of the invention.

The process carried out by the invention, as implemented by the above-discussed apparatus, including the data of Appendix "B" and the software programs of Appendix "A" and "C", is shown in FIG. 3. There is a stochastic generation of language tiles, step 41. From this generation 41, data for a base tile is generated from the program information of Appendix "B", as discussed above, and additional data for generating a tile set, or language of a desired size is generated and stored in compressed format in a hard drive, step 43.

Information is obtained from the desktop publisher, step 45. This information is image setter/press selection information 15 and image data 13. Any ambient factors about the operating conditions of the flexo-press are obtained, step 47. These factors 19 and selection data 15 are used in a generation step 49 in which calibration for generating an interpreter language is used.

The next step 51 is to read the calibration data generated and to find a base tile needed for the calibration factors, step 51. This step 51 includes de-compiling the data held in compressed storage. Following this, all of the tiles (words) needed for the specific language to be applied to the specific situation is built 53. This specific language of 1000 times "n" words is then stored, step 55. The storage 55 is within the internally available memory of the Sun unit 31.

Image data 13 from the desktop publisher 11 is held in a buffer, step 57 until needed. This data 13 is then moved to the translator step 59, where it is replace by tile data values from the language section of words built in step 53 and stored in step 55. This replacement is provided in step 59 by an algorithm which defines the specific substitution of tile values. This algorithm, as will be discussed further below, is carried out by the program of Appendix "A". The enhanced value set (1000 times "n" in size) provides the output 61 which is held in an output buffer 63 until needed. These values are then moved to the image setter, step 65.

The process carried on in step 59 is an iterative one where the image date values are replaced by tile values on a pixel by pixel basis. The buffer 57 and buffer 63 temporary storage steps facilitate a multi-processing environment in the Sun unit 31. These buffer steps may not be used in a dedicated processor or where processor speed is sufficient not to need temporary storage.

The programs resident in the invention are typically written in "C" language for UNIX and Macintosh platforms. Other language implementation will provide equivalent structure and process steps and is within the scope of the invention.

Figure 4A:
FIG. 4a shows dot shapes generated by the interpreter tiles.

The dot shapes generated by the invention are shown in FIG. 4a. These dot shapes are made up of basic pixel tiles which are the words or building blocks of the translator language. In FIG. 4a the tiles are square. However, the invention is not limited to this shape, and contemplates many other shapes. The software of Appendix "A" allows for various predetermined shape definitions, including square, rectangle, round, and others.

Figure 4B:
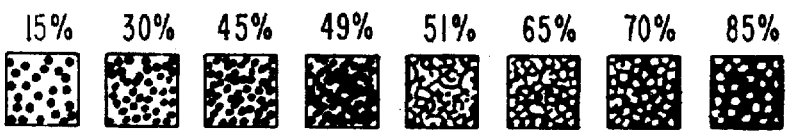
FIG. 4b shows a typical tone pattern generated by the invention for gray densities of 15, 30, 45, 49, 51, 65, 70 and 85 percent, respectively, at flexo-press output.

FIG. 4b shows a series of gray scale patterns printed by a flexo-press driven by the present invention. The patterns show a density of 15, 30, 45, 49, 51, 65, 70 and 85 percent, respectively. Pattern inverse, white for black, is shown over 50 percent.

Figure 4C:
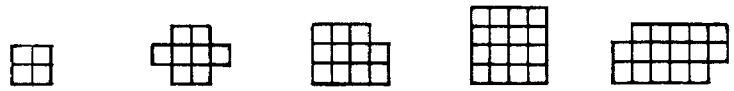
FIG. 4c shows examples of dot construction for clusters of 4, 8, 11 and 16 pixels, respectively, as generated by the invention for flexo-press input.
Figure 4D:
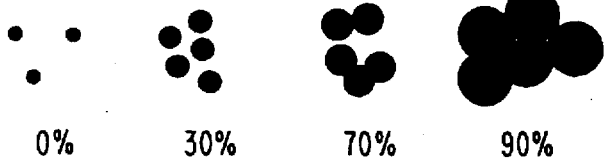
FIG. 4d shows examples of openness dot structure of 0, 30 70 and 90 percent, respectively, generated at flexo-press output with the invention.

FIG. 4c shows further examples of dot cluster construction capable with the invention. FIG. 4d shows dot structure openness made possible with the invention. This FIG. 4c illustrates the output quality of the flexo-press when used with the invention.

Figure 5:
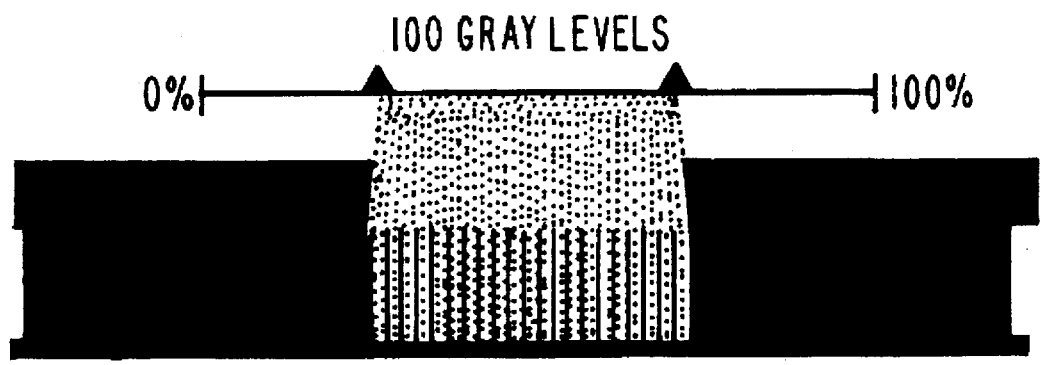
FIG. 5 shows the processing tonal range screening capability of the prior art.
Figure 6:
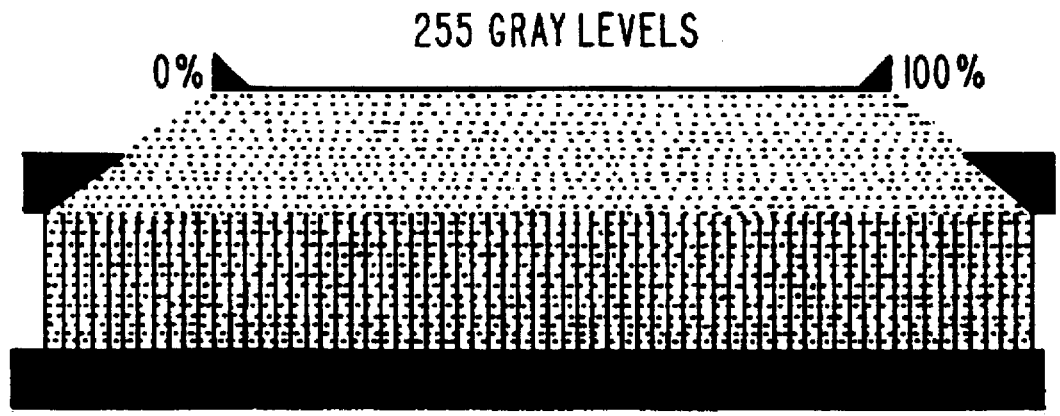
FIG. 6 shows the processing tonal range screening capability of the present invention.

FIGS. 5 and 6 allow a comparison of the performance of the invention compare to the prior art. These figures illustrate the resultant tonal range capabilities of the flexo-press with the prior art, FIG. 5, and the invention. Both FIGS. 5 and 6 provide data at 3 percent error, that determined acceptable. The tonal range provided by the invention is more than three times that of the prior art.

Many changes can be made in the above-described invention without departing from the intent and scope thereof. It is thereby intended that the above description be read in the illustrative sense and not in the limiting sense.

APPENDIX "A"

Professional Software Technologies, Inc. © Copyright 1995

```
#include "typedefs.h"
#include "dialogStuff.h"
#include "globals.h"
#include "Press.h"
#include <string.h>
#include <math.h>
#include "Error.h"
```
```
#define kPressDialog 9100
#define kPGraphBox 2
#define kPLine 26
#define kFirstInput 3
#define kLastInput 13
#define kFirstCTInput 28
#define kLastCTInput 38
#define kJobPopMenu 1005
#define kJobPop 42
#define      kLoadButton 45
#define kSaveButton 46
#define kResetLwButton 43
#define kResetCtButton 44
#define kTextLW 40
#define kTextCT 41
define kSameCheck 39 void DrawPressInBox(short *pressCT, short *press,Rect *box,DialogPtr dlgPtr);
    void EnableCTinput(DialogPtr dlgPtr, Boolean active);
    void UpdateValItems(DialogPtr dlgPtr, short *myPtr);
    void UpdateValItemsCT(DialogPtr dlgPtr, short *myPtr);
    double GetItemHit(DialogPtr dlgPtr, short itemHit);

ifdef never void DoPress(short jobNum)
    {
    DialogPtr dlgPtr;
    DialogRecord myDlgRecord;
    short itemHit;
    JOB_HANDLE jobHan;
    short i,g;
    Rect box, textBox;
    MenuHandle jobPop;
    short      theFile, err;
    double           ratio, newVal, sy, ey, ex;
    SFReply          reply;
    Point      where;
    SFTypeList myList;
    long       count;
    jobPop=GetMenu(kJobPopMenu);
    if (jobPop)
        {
        RmveResource((Handle)jobPop);
        DisposHandle((Handle)jobPop);
        }
```

A 1

Professional Software Technologies, Inc. © Copyright 1995

```
jobPop=NewMenu(kJobPopMenu,"\p");
AddResource((Handle)jobPop,'MENU',kJobPopMenu,"\p");

if(jobPop)
    {
    for(g=0; g<numJobs; g++)
        {
        HLock((Handle)jobList[g]);
        if((*jobList[g])->isSeparation)
            {
            AppendMenu(jobPop, (unsigned char*)(*jobList[g])->cName);
            SetItem(jobPop, g+1, (unsigned char*)(*jobList[g])->cName);
            }
        else
            {
            AppendMenu(jobPop, (unsigned char*)(*jobList[g])->job.jf.fName);
            SetItem(jobPop, g+1, (unsigned char*)(*jobList[g])->job.jf.fName);
            }
        HUnlock((Handle)jobList[g]);
        }
    } jobHan=jobList[jobNum];
HLock((Handle)jobHan);

dlgPtr=GetNewDialog(kPressDialog,&myDlgRecord,(WindowPtr)-1);
FrameOK(dlgPtr);
SetPort(dlgPtr);

SetItemCtlValue(dlgPtr, kJobPop, jobNum+1);
SetItemRBValue(dlgPtr, kSameCheck, (*jobHan)->sameCals);

EnableCTinput(dlgPtr, !(*jobHan)->sameCals);

DrawItemBox(dlgPtr,kPLine);

PenNormal();
PenSize(1,1);

box = GetItemBox(dlgPtr, kPGraphBox);
UpdateValItemsCT(dlgPtr, (short*)(*jobHan)->pressCT);
UpdateValItems(dlgPtr, (short*)(*jobHan)->press);

SelIText(dlgPtr,kFirstInput,0,32768);

DrawPressInBox((*jobHan)->pressCT, (*jobHan)->press,&box,dlgPtr);
ValidRect((Rect*)&(dlgPtr->visRgn)); /*......??????......*/
        DrawEditText(dlgPtr);
itemHit=-1;

do
    {
    isSaved = FALSE;
    if (((itemHit==kLoadButton)||(itemHit==kSaveButton)||(itemHit==-1))
        {
        textBox = GetItemBox (dlgPtr, kTextLW);
        ForeColor (redColor);
        TextBox ("LW", 2, &textBox, teJustCenter);
        textBox = GetItemBox (dlgPtr, kTextCT);
        ForeColor (blueColor);
        TextBox ("CT", 2, &textBox, teJustCenter);
```

A 2

Professional Software Technologies, Inc. © Copyright 1995
```
            ForeColor (blackColor);
            }
#ifdef      JPPC
ModalDialog(NewModalFilterProc(SreeFilter),&itemHit);
#else
ModalDialog((ProcPtr)SreeFilter,&itemHit);
#endif
      if(itemHit == kFirstInput)
            {
            sy = GetItemHit(dlgPtr,itemHit);
            ey = GetItemHit(dlgPtr,itemHit+1);
            if ((*jobHan)->press[(itemHit-kFirstInput)*30]!=sy)
                  {
                  ratio = (ey-sy)/30;
                  ex = ((itemHit-kFirstInput+1)*30);
                  for (i=(itemHit-kFirstInput)*30; i<(itemHit-kFirstInput+1)*30;
i++)
                        {
                              newVal = floor( (fabs(((ex-i)*ratio - ey))) +.5);
                              if((*jobHan)->sameCals)
                                    (*jobHan)->pressCT[i] = (*jobHan)->press[i] =
newVal;
                              else
                                    (*jobHan)->press[i] = newVal;
                        }
                  DrawPressInBox((*jobHan)->pressCT, (*jobHan)->press,&box,dlgPtr);
                  }
            }
      if ((itemHit>=kFirstInput+1)&&(itemHit<=kLastInput-1))
            {
            sy = GetItemHit(dlgPtr,itemHit-1);
            ey = GetItemHit(dlgPtr,itemHit);
            if ((*jobHan)->press[(itemHit-kFirstInput)*30]!=ey)
                  {
                  ratio = (ey-sy)/30;
                  ex = ((itemHit-kFirstInput)*30);
                  for (i=(itemHit-kFirstInput-1)*30; i<(itemHit-kFirstInput)*30;
i++)
                        {
                              newVal = floor( (fabs(((ex-i)*ratio - ey))) +.5);
                              if((*jobHan)->sameCals)
                                    (*jobHan)->pressCT[i] = (*jobHan)->press[i] =
newVal;
                              else
                                    (*jobHan)->press[i] = newVal;
                        }
                  sy = GetItemHit(dlgPtr,itemHit);
                  ey = GetItemHit(dlgPtr,itemHit+1);
                  ratio = (ey-sy)/30;
                  ex = ((itemHit-kFirstInput+1)*30);
                  for (i=(itemHit-kFirstInput)*30; i<(itemHit-kFirstInput+1)*30;
i++)
                        {
                              newVal = floor( (fabs(((ex-i)*ratio - ey))) +.5);
                              if((*jobHan)->sameCals)
                                    (*jobHan)->pressCT[i] = (*jobHan)->press[i] =
newVal;
                              else
                                    (*jobHan)->press[i] = newVal;
                        }
                  DrawPressInBox((*jobHan)->pressCT, (*jobHan)->press,&box,dlgPtr);
            }
```

Professional Software Technologies, Inc. © Copyright 1995
```
        }
    if(itemHit == kLastInput)
        {
            sy = GetItemHit(dlgPtr,itemHit-1);
            ey = GetItemHit(dlgPtr,itemHit);
            if ((*jobHan)->press[(itemHit-kFirstInput)*30-1]!=ey)
                {
                    ratio = (ey-sy)/30;
                    ex = ((itemHit-kFirstInput)*30);
                    for (i=(itemHit-kFirstInput-1)*30; i<(itemHit-kFirstInput)*30;
i++)
                        {
                            newVal = floor( (fabs(((ex-i)*ratio - ey))) +.5);
                            if((*jobHan)->sameCals)
                                    (*jobHan)->pressCT[i] = (*jobHan)->press[i] =
newVal;
                            else
                                    (*jobHan)->press[i] = newVal;
                        }
                    (*jobHan)->press[(itemHit-kFirstInput)*30-1] = ey;
                    DrawPressInBox((*jobHan)->pressCT, (*jobHan)->press,&box,dlgPtr);
                }
        } if(itemHit == kFirstCTInput)
        {
            sy = GetItemHit(dlgPtr,itemHit);
            ey = GetItemHit(dlgPtr,itemHit+1);
            if ((*jobHan)->pressCT[(itemHit-kFirstCTInput)*30]!=sy)
                {
                    ratio = (ey-sy)/30;
                    ex = ((itemHit-kFirstCTInput+1)*30);
                    for (i=(itemHit-kFirstCTInput)*30; i<(itemHit-kFirstCTInput+1)*30;
i++)
                        {
                            newVal = floor( (fabs(((ex-i)*ratio - ey))) +.5);
                            (*jobHan)->pressCT[i] = newVal;
                        }
                    DrawPressInBox((*jobHan)->pressCT, (*jobHan)->press,&box,dlgPtr);
                }
        }
    if ((itemHit>=kFirstCTInput+1)&&(itemHit<=kLastCTInput-1))
        {
            sy = GetItemHit(dlgPtr,itemHit-1);
            ey = GetItemHit(dlgPtr,itemHit);
            if ((*jobHan)->pressCT[(itemHit-kFirstCTInput)*30]!=ey)
                {
                    ratio = (ey-sy)/30;
                    ex = ((itemHit-kFirstCTInput)*30);
                    for (i=(itemHit-kFirstCTInput-1)*30; i<(itemHit-kFirstCTInput)*30;
i++)
                        {
                            newVal = floor( (fabs(((ex-i)*ratio - ey))) +.5);
                            (*jobHan)->pressCT[i] = newVal;
                        }
                    sy = GetItemHit(dlgPtr,itemHit);
                    ey = GetItemHit(dlgPtr,itemHit+1);
                    ratio = (ey-sy)/30;
                    ex = ((itemHit-kFirstCTInput+1)*30);
                    for (i=(itemHit-kFirstCTInput)*30; i<(itemHit-kFirstCTInput+1)*30;
i++)
                        {
```

A 4

Professional Software Technologies, Inc. © Copyright 1995

```
                        newVal = floor( (fabs(((ex-i)*ratio - ey))) +.5);
                        (*jobHan)->pressCT[i] = newVal;
                    }
                    DrawPressInBox((*jobHan)->pressCT, (*jobHan)->press,&box,dlgPtr);
                }
        if(itemHit == kLastCTInput)
            {
            sy = GetItemHit(dlgPtr,itemHit-1);
            ey = GetItemHit(dlgPtr,itemHit);
            ratio = (ey-sy)/30;
            ex = ((itemHit-kFirstCTInput)*30);
            if ((*jobHan)->pressCT[(itemHit-kFirstCTInput)*30-1]!=ey)
                {
                for (i=(itemHit-kFirstCTInput-1)*30; i<(itemHit-kFirstCTInput)*30;
i++)
                    {
                        newVal = floor( (fabs(((ex-i)*ratio - ey))) +.5);
                        (*jobHan)->pressCT[i] = newVal;
                    }
                (*jobHan)->pressCT[(itemHit-kFirstCTInput)*30-1] = ey;
                DrawPressInBox((*jobHan)->pressCT, (*jobHan)->press,&box,dlgPtr);
                }
            } if(itemHit == kSameCheck)
            {
            if(!(*jobHan)->sameCals)
                {
                for (i=0;i<300;i++)
                    (*jobHan)->pressCT[i]=(*jobHan)->press[i];
                DrawPressInBox((*jobHan)->pressCT, (*jobHan)->press,&box,dlgPtr);
                }
            else
                {
                UpdateValItemsCT(dlgPtr, (short*)(*jobHan)->pressCT);
                }
            (*jobHan)->sameCals = !(*jobHan)->sameCals;
            SetItemRBValue(dlgPtr, kSameCheck, (*jobHan)->sameCals);
            EnableCTinput(dlgPtr, !(*jobHan)->sameCals);
            }
        if(itemHit == kResetLwButton)
            {
            if((*jobHan)->sameCals)
                {
                for (i=0;i<299;i++)
                        (*jobHan)->pressCT[i]=(*jobHan)->press[i]=i;
                (*jobHan)->pressCT[299]=(*jobHan)->press[299]=300;
                UpdateValItemsCT(dlgPtr, (short*)(*jobHan)->pressCT);
                UpdateValItems(dlgPtr, (short*)(*jobHan)->press);
                }
            else
                {
                for (i=0;i<299;i++)
                        (*jobHan)->press[i]=i;
                (*jobHan)->press[299]=300;
                UpdateValItems(dlgPtr, (short*)(*jobHan)->press);
                }
            DrawPressInBox((*jobHan)->pressCT, (*jobHan)->press,&box,dlgPtr);
            }
        if(itemHit == kResetCtButton)
            {
```

A 5

Professional Software Technologies, Inc. © Copyright 1995

```
            for (i=0;i<299;i++)
                (*jobHan)->pressCT[i]=i;
            (*jobHan)->pressCT[299]=300;
            UpdateValItemsCT(dlgPtr, (short*)(*jobHan)->pressCT);
            DrawPressInBox((*jobHan)->pressCT, (*jobHan)->press,&box,dlgPtr);
            }
        if(itemHit == kJobPop)
            {
            HUnlock((Handle)jobHan);
            i = GetItemCtlValue(dlgPtr, kJobPop);
            jobHan=jobList[i-1];
            HLock((Handle)jobHan);
            SetItemCtlValue(dlgPtr, kJobPop, i);
            UpdateValItemsCT(dlgPtr, (short*)(*jobHan)->pressCT);
            UpdateValItems(dlgPtr, (short*)(*jobHan)->press);
            SetItemRBValue(dlgPtr, kSameCheck, (*jobHan)->sameCals);
            EnableCTinput(dlgPtr, !(*jobHan)->sameCals);
            DrawPressInBox((*jobHan)->pressCT, (*jobHan)->press,&box,dlgPtr);
            }
        if(itemHit == kSaveButton)
            {
            SetPort( dlgPtr);
            SetPt (&where, 0, 0);
            LocalToGlobal (&where);
            SFPutFile(where, "\pSave cal file", "\pUntitled.cal", NULL, &reply);
            if(reply.good)
                {
                FSDelete(reply.fName, reply.vRefNum);
                Create(reply.fName, reply.vRefNum, 'msnr', 'CAL ');
                err = FSOpen(reply.fName, reply.vRefNum, &theFile);
                if(err == noErr)
                    {
                    count = 600;
                    err = FSWrite(theFile, &count, (*jobHan)->press);
                    if((err != noErr) || count != 600)
                        {
                        NonFatalError("\pUnable to write file");
                        goto DONE_SAVE;
                        }
                    err = FSWrite(theFile, &count, (*jobHan)->pressCT);
                    if((err != noErr) || count != 600)
                        {
                        NonFatalError("\pUnable to write file");
                        goto DONE_SAVE;
                        }
                    count = sizeof (short);
                    err = FSWrite(theFile, &count, &(*jobHan)->sameCals);
                    if(err != noErr)
                        {
                        NonFatalError("\pUnable to write file");
                        goto DONE_SAVE;
                        }
            DONE_SAVE:
                    FSClose(theFile);
                    }
                else
                    NonFatalError("\pUnable to create file");
                }
            SetPort (dlgPtr);
            DrawItemBox(dlgPtr,kPLine);
            DrawPressInBox((*jobHan)->pressCT, (*jobHan)->press,&box,dlgPtr);
            itemHit=-1;
```

A 6

Professional Software Technologies, Inc. © Copyright 1995

```
        )
    if(itemHit == kLoadButton)
        {
            SetPort( dlgPtr);
            SetPt (&where, 0, 0);
            LocalToGlobal (&where);
            myList[0] = 'CAL ';
            SFGetFile(where, "\pSave cal file", NULL, 1, myList, NULL, &reply);
            if(reply.good)
                {
                    err = FSOpen(reply.fName, reply.vRefNum, &theFile);
                    if(err == noErr)
                        {
                            count = 600;
                            err = FSRead(theFile, &count, (*jobHan)->press);
                            if((err != noErr) || count != 600)
                                {
                                    NonFatalError("\pUnable to read file");
                                    goto DONE_LOAD;
                                }
                            err = FSRead(theFile, &count, (*jobHan)->pressCT);
                            if((err != noErr) || count != 600)
                                {
                                    NonFatalError("\pUnable to read file");
                                    goto DONE_LOAD;
                                }
                            count = sizeof (short);
                            err = FSRead(theFile, &count, &(*jobHan)->sameCals);
                            if(err != noErr)
                                {
                                    NonFatalError("\pUnable to read file");
                                    goto DONE_SAVE;
                                }
                            if((*jobHan)->sameCals)
                                {
                                    for (i=0;i<300;i++)
                                        (*jobHan)->pressCT[i] = (*jobHan)->press[i];
                                }
                            EnableCTinput(dlgPtr, !(*jobHan)->sameCals);

DONE_LOAD:
                            FSClose(theFile);
                            SetItemRBValue (dlgPtr, kSameCheck, (*jobHan)->sameCals);
                            UpdateValItemsCT(dlgPtr, (short*)(*jobHan)->pressCT);
                            UpdateValItems(dlgPtr, (short*)(*jobHan)->press);
                            DrawPressInBox((*jobHan)->pressCT, (*jobHan)-
>press,&box,dlgPtr);
                        }
                    else
                        NonFatalError("\pUnable to open file");
                }
            SetPort (dlgPtr);
            DrawItemBox(dlgPtr,kPLine);
            DrawPressInBox((*jobHan)->pressCT, (*jobHan)->press,&box,dlgPtr);
            itemHit=-1;
        }
    }
while (itemHit!=1);

CloseDialog(dlgPtr);
HUnlock((Handle)jobHan);
}
```

A 7

Professional Software Technologies, Inc. © Copyright 1995

```
void DrawPressInBox(short *pressCT, short *press,Rect *box,DialogPtr dlgPtr)
{
short i;
long h,w,x,y;
Rect b;
RgnHandle c,res,resR;
Handle resHandle;
RGBColor black = (65535, 65535, 65535);

b = GetItemBox(dlgPtr,14);
resHandle=(Handle)GetPicture(2005);
DrawPicture((PicHandle)resHandle,&b);
c=NewRgn();
res=NewRgn();
resR=NewRgn();

GetClip(c);
RectRgn(res,box);
SectRgn(c,res,resR);
SetClip(resR);

x=(*box).left-1;
w=(*box).right-(*box).left;

y=(*box).bottom-1;
h=(*box).bottom-(*box).top;

PenSize(2,2);

MoveTo(x,y);
ForeColor(redColor);

for (i=0;i<=300;i++)
      {
      if (i!=300)
            LineTo((double)((double)i/(double)300)*h+x,y-((unsigned
short)press[i])*h/300);
      else
            LineTo((double)((double)i/(double)300)*h+x,y-((unsigned short)press[i-
1])*h/300);
      i+=4;
      }
x+=2;
w+=2;
MoveTo(x,y);
ForeColor(blueColor);
for (i=0;i<=300;i++)
      {
      if (i!=300)
            LineTo((double)((double)i/(double)300)*h+x,y-((unsigned
short)pressCT[i])*h/300);
      else
            LineTo((double)((double)i/(double)300)*h+x,y-((unsigned short)pressCT[i-
1])*h/300);
```

A 8

Professional Software Technologies, Inc. © Copyright 1995

```
        i+=4;
        }
ForeColor(blackColor);
PenNormal();

SetClip(c);
DisposeRgn(c);
DisposeRgn(res);
DisposeRgn(resR);
} void EnableCTinput(DialogPtr dlgPtr, Boolean active)
{
short      i;

if(active)
        {
        for(i=kFirstCTInput; i<=kLastCTInput; i++)
                {
                ActivateEText(dlgPtr, i);
                }
        }
else
        {
        for(i=kFirstCTInput; i<=kLastCTInput; i++)
                {
                DeactivateEText(dlgPtr, i);
                }
        }
} void UpdateValItems(DialogPtr dlgPtr, short *myPtr)
{
short i;

ConvertDoubleToItem(dlgPtr,(unsigned short)myPtr[0]/3,kFirstInput,FALSE);
for (i=1;i<10;i++)
        {
            ConvertDoubleToItem(dlgPtr, (unsigned short)myPtr[i*30]/3,
kFirstInput+i, FALSE);
        }
ConvertDoubleToItem(dlgPtr, (unsigned short)myPtr[299]/3, kLastInput, FALSE);
}
```

A 9

```
Professional Software Technologies, Inc. © Copyright 1995
void UpdateValItemsCT(DialogPtr dlgPtr, short *myPtr)
{
short i;

ConvertDoubleToItem(dlgPtr,(unsigned short)myPtr[0]/3,kFirstCTInput,FALSE);
for (i=1;i<10;i++)
    {
        ConvertDoubleToItem(dlgPtr, (unsigned short)myPtr[i*30]/3,
kFirstCTInput+i, FALSE);
    }
ConvertDoubleToItem(dlgPtr, (unsigned short)myPtr[299]/3, kLastCTInput, FALSE);
} double GetItemHit(DialogPtr dlgPtr, short itemHit)
{
double          tempD;

tempD = 3*ConvertItemToDouble(dlgPtr,itemHit,FALSE);
return(tempD);
} endif
```

APPENDIX "B"

Professional Software Technologies, Inc. © Copyright 1995

```
00000005 00000005 00000070 00000070 00000038 00001880 00000038 00000005
00000005 00000070 000000E0 00000070 00006200 00000000 05020711 1F354F96
B7D1EDF2 F9EEE0CB B194482F 1B0D0502 07111F35 4F96B7D1 EDF2F9EE E0CBB194
482F1B0D 05020711 1F354F96 B7D1EDF2 F6F9EEE0 CBB19448 2F1B0D05 0207111F
354F96B7 D1EDF2F9 EEE0CBB1 94482F1B 0D050207 111F354F 96B7D1ED F2F9EEE0
CBB19448 2F1B0D05 0E091015 273D5790 B0D4DDE3 E7EAD9C3 A88D4F37 22130E09
1015273D 5790B0D4 DDE3E7EA D9C3A88D 4F372213 0E091015 273D5790 B0D4DDE3
E7E2EAD9 C3A88D4F 3722130E 09101527 3D5790B0 D4DDE3E7 EAD9C3A8 8D4F3722
130E0910 15273D57 90B0D4DD E3E7EAD9 C3A88D4F 3722130E 1C171F25 31445F8B
ADC0C7D0 D6CCCEBD 9F895A3E 2C231C17 1F253144 5FBBADC0 C7D0D6CC CEBD9F89
5A3E2C23 1C171F25 31445F8B ADC0C7D0 D6CCC5CE BD9F895A 3E2C231C 171F2531
445F8BAD C0C7D0D6 CCCEBD9F 895A3E2C 231C171F 2531445F 8BADC0C7 D0D6CCCE
BD9F895A 3E2C231C 3029333A 41596792 9CA3AFB6 B9B3AAA7 99856253 3F3B3029
333A4159 67929CA3 AFB6B9B3 AAA79985 62533F38 3029333A 41596792 9CA3AFB6
B9B3AAA1 A7998562 533F3830 29333A41 5967929C A3AFB6B9 B3AAA799 8562533F
38302933 3A415967 929CA3AF B6B9B3AA A7998562 533F3830 4B464C56 5F657A79
7E7D786D 706F6E77 8F826863 5D524B46 4C565F65 7A797E7D 786D706F 6E778F82
68635D52 4B464C56 5F657A79 7E7D786D 706F6E77 778F8268 635D524B 464C565F
657A797E 7D786D70 6F6E778F 8268635D 524B464C 565F657A 797E7D78 6D706F6E
778F8268 635D524B 6F6C807F 7C8E8169 645C514A 474D555E 66757473 72716F6C
807F7C8E 8169645C 514A474D 555E6675 74737271 6F6C807F 7CBE8169 645C514A
474D555E 666B7574 7372716F 6C807F7C 8E816964 5C514A47 4D555E66 75747372
716F6C80 7F7C8E81 69645C51 4A474D55 5E667574 7372716F B5BAB4AB A7988661
5440392F 2A343B42 5867919D A4AEB5BA B4ABA798 86615440 392F2A34 3B425867
919DA4AE B5BAB4AB A7988661 5440392F 2A343B42 58678791 9DA4AEB5 BAB4ABA7
98866154 40392F2A 343B4258 67919DA4 AEB5BAB4 ABA79886 61544039 2F2A343B
42586791 9DA4AEB5 CFD7CDCF BCA0B85B 3F2B241D 181E2632 4360BAAC BFC7CFD7
CDCFBCA0 885B3F2B 241D181E 26324360 8AACBFC7 CFD7CDCF BCA0885B 3F2B241D
181E2632 4360BAA6 ACBFC7CF D7CDCFBC A0885B3F 2B241D18 1E263243 60BAACBF
C7CFD7CD CFBCA0B8 5B3F2B24 1D181E26 3243608A ACBFC7CF E4EBEBD8 C4A98C50
3721140F 0A0F1627 3C578FAF D5DCE4EB EBD8C4A9 8C503721 140F0A0F 16273C57
8FAFD5D2 E4EBEBD8 C4A98C50 3721140F 0A0F1627 3C578FAF C8D5DCE4 E8EBD8C4
A98C5037 21140F0A 0F16273C 578FAFD5 DCE4E8EB D8C4A98C 50372114 0F0A0F16
273C578F AFD5DCE4 F1F8EFDF CAB29347 2E1A0C06 03071220 364E97B8 D2ECF1F8
EFDFCAB2 93472E1A 0C060307 1220364E 97B8D2EC F1F8EFDF CAB29347 2E1A0C06
03071220 364E97B8 D2E6ECF1 F8EFDFCA B293472E 1A0C0603 07122036 4E97B8D2
ECF1F8EF DFCAB293 472E1A0C 06030712 20364E97 B8D2ECF1 FFFCF5E7 D3B79545
28170801 00040B19 2D4997BB D7E9FFFC F5E7D3B7 95452817 08010004 0B192D49
97BBD7E9 FFFCF5E7 D3B79545 28170801 00040B19 2D4997BB D7E9F7FF FCF5E7D3
B7954528 17080100 040B192D 4997BBD7 E9FFFCF5 E7D3B795 45281708 0100040B
192D4997 BBD7E9FA F2F9EEE0 CBB19448 2F1B0D05 0207111F 354F96B7 D1EDF2F9
EEE0CBB1 94482F1B 0D050207 111F354F 96B7D1ED F2F9EEE0 CBB19448 2F1B0D05
0207111F 354F96B7 D1E5EDF2 F9EEE0CB B194482F 1B0D0502 07111F35 4F96B7D1
EDF2F9EE E0CBB194 482F1B0D 05020711 1F354F96 B7D1EDF2 E3E7EAD9 C3A88D4F
3722130E 09101527 3D5790B0 D4DDE3E7 EAD9C3A8 8D4F3722 130E0910 15273D57
90B0D4DD E3E7EAD9 C3A88D4F 3722130E 09101527 3D5790B0 C9D4DDE3 E7EAD9C3
A88D4F37 22130E09 1015273D 5790B0D4 DDE3E7EA D9C3A88D 4F372213 0E091015
273D5790 B0D4DDE3 D0D6CCCE BD9F895A 3E2C231C 171F2531 445F8BAD C0C7D0D6
CCCEBD9F 895A3E2C 231C171F 2531445F 8BADC0C7 D0D6CCCE BD9F895A 3E2C231C
171F2531 445F8BA5 ADC0C7D0 D6CCCEBD 9F895A3E 2C231C17 1F253144 5FBBADC0
C7D0D6CC CEBD9F89 5A3E2C23 1C171F25 31445F8B ADC0C7D0 B6B9B3AA A7998562
533F3830 29333A41 5967929C A3AFB6B9 B3AAA799 8562533F 38302933 3A415967
929CA3AF B6B9B3AA A7998562 533F3830 29333A41 59678792 9CA3AFB6 B9B3AAA7
99856253 3F3B3029 333A4159 67929CA3 AFB6B9B3 AAA79985 62533F38 3029333A
41596792 9CA3AFB6 6D706F6E 778F8268 635D524B 464C565F 657A797E 7D786D70
6F6E778F 8268635D 524B464C 565F657A 797E7D78 6D706F6E 778F8268 635D524B
464C565F 656A7A79 7E7D786D 706F6E77 8F826863 5D524B46 4C565F65 7A797E7D
786D706F 6E778F82 68635D52 4B464C56 5F657A79 7E7D786D 4A474D55 5E667574
```

B 1

Professional Software Technologies, Inc. © Copyright 1995

```
7372716F 6C807F7C BE816964 5C514A47 4D555E66 75747372 716F6C80 7F7C8E81
69645C51 4A474D55 5E667574 7372716F 6C807F7C 7B8E8169 645C514A 474D555E
66757473 72716F6C 807F7C8E 8169645C 514A474D 555E6675 74737271 6F6C807F
7C8E8169 645C514A 2F2A343B 42586791 9DA4AEB5 BAB4ABA7 98866154 40392F2A
343B4258 67919DA4 AEB5BAB4 ABA79BB6 61544039 2F2A343B 42586791 9DA4AEB5
BAB4ABA2 A79B8661 5440392F 2A343B42 5867919D A4AEB5BA B4ABA79B 86615440
392F2A34 3B425867 919DA4AE B5BAB4AB A79B8661 5440392F 1D181E26 3243608A
ACBFC7CF D7CDCFBC A0B85B3F 2B241D1B 1E263243 60BAACBF C7CFD7CD CFBCA0BB
5B3F2B24 1D181E26 3243608A ACBFC7CF D7CDC6CF BCA0885B 3F2B241D 181E2632
4360BAAC BFC7CFD7 CDCFBCA0 885B3F2B 241D181E 26324360 BAACBFC7 CFD7CDCF
BCA0885B 3F2B241D 0F0A0F16 273C578F AFD5DCE4 E8EBD8C4 A98C5037 21140F0A
0F16273C 578FAFD5 DCE4E8EB D8C4A98C 50372114 0F0A0F16 273C578F AFD5DCE4
E8E1EBD8 C4A98C50 3721140F 0A0F1627 3C578FAF D5DCE4E8 EBD8C4A9 8C503721
140F0A0F 16273C57 BFAFD5DC E4E8EBD8 C4A98C50 3721140F 06030712 20364E97
BBD2ECF1 F8EFDFCA B293472E 1A0C0603 07122036 4E97BBD2 ECF1F8EF DFCAB293
472E1A0C 06030712 20364E97 B8D2ECF1 F7F8EFDF CAB29347 2E1A0C06 03071220
364E97B8 D2ECF1F8 EFDFCAB2 93472E1A 0C060307 1220364E 97B8D2EC F1F8EFDF
CAB29347 2E1A0C06 0100040B 192D4997 BBD7E9FF FCF5E7D3 B7954528 17080100
040B192D 4997BBD7 E9FFFCF5 E7D3B795 45281708 0100040B 192D4997 BBD7E9FA
FFFCF5E7 D3B79545 28170801 00040B19 2D4997BB D7E9FFFC F5E7D3B7 95452817
08010004 0B192D49 97BBD7E9 FFFCF5E7 D3B79545 28170801 05020711 1F354F96
B7D1EDF2 F9EEE0CB B194482F 1B0D0502 07111F35 4F96B7D1 EDF2F9EE E0CBB194
482F1B0D 05020711 1F354F96 B7D1EDF2 F6F9EEE0 CBB19448 2F1B0D05 0207111F
354F96B7 D1EDF2F9 EEE0CBB1 94482F1B 0D050207 111F354F 96B7D1ED F2F9EEE0
CBB19448 2F1B0D05 0E091015 273D5790 B0D4DDE3 E7EAD9C3 A88D4F37 22130E09
1015273D 5790B0D4 DDE3E7EA D9C3A88D 4F372213 0E091015 273D5790 B0D4DDE3
E7E2EAD9 C3A88D4F 3722130E 09101527 3D5790B0 D4DDE3E7 EAD9C3AB 8D4F3722
130E0910 15273D57 90B0D4DD E3E7EAD9 C3A88D4F 3722130E 1C171F25 31445F8B
ADC0C7D0 D6CCCEBD 9F895A3E 2C231C17 1F253144 5F8BADC0 C7D0D6CC CEBD9F89
5A3E2C23 1C171F25 31445F8B ADC0C7D0 D6CCC5CE BD9F895A 3E2C231C 171F2531
445F8BAD C0C7D0D6 CCCEBD9F 895A3E2C 231C171F 2531445F 8BADC0C7 D0D6CCCE
BD9F895A 3E2C231C 3029333A 41596792 9CA3AFB6 B9B3AAA7 99856253 3F383029
333A4159 67929CA3 AFB6B9B3 AAA79985 62533F3B 3029333A 41596792 9CA3AFB6
B9B3AAA1 A7998562 533F3830 29333A41 5967929C A3AFB6B9 B3AAA799 8562533F
38302933 3A415967 929CA3AF B6B9B3AA A7998562 533F3830 4B464C56 5F657A79
7E7D786D 706F6E77 8F826863 5D524B46 4C565F65 7A797E7D 786D706F 6E77BFB2
68635D52 4B464C56 5F657A79 7E7D786D 706F6E77 77BF8268 635D524B 464C565F
657A797E 7D786D70 6F6E778F 8268635D 524B464C 565F657A 797E7D78 6D706F6E
77BF8268 635D524B 6F6C807F 7C8E8169 645C514A 474D555E 66757473 72716F6C
807F7C8E 8169645C 514A474D 555E6675 74737271 6F6C807F 7C8E8169 645C514A
474D555E 666B7574 7372716F 6C807F7C 8E816964 5C514A47 4D555E66 75747372
716F6C80 7F7C8E81 69645C51 4A474D55 5E667574 7372716F B5BAB4AB A79BB661
5440392F 2A343B42 5867919D A4AEB5BA B4ABA79B 86615440 392F2A34 3B425867
919DA4AE B5BAB4AB A79B8661 5440392F 2A343B42 58678791 9DA4AEB5 BAB4ABA7
98866154 40392F2A 343B4258 67919DA4 AEB5BAB4 ABA79B86 61544039 2F2A343B
42586791 9DA4AEB5 CFD7CDCF BCA0885B 3F2B241D 181E2632 4360BAAC BFC7CFD7
CDCFBCA0 BB5B3F2B 241D1B1E 26324360 BAACBFC7 CFD7CDCF BCA0885B 3F2B241D
181E2632 4360BAA6 ACBFC7CF D7CDCFBC A0885B3F 2B241D1B 1E263243 60BAACBF
C7CFD7CD CFBCA0BB 5B3F2B24 1D181E26 3243608A ACBFC7CF E4E8EBD8 C4A98C50
3721140F 0A0F1627 3C578FAF D5DCE4E8 EBD8C4A9 BC503721 140F0A0F 16273C57
BFAFD5DC E4E8EBD8 C4A98C50 3721140F 0A0F1627 3C578FAF C8D5DCE4 EBEBD8C4
A98C5037 21140F0A 0F16273C 578FAFD5 DCE4E8EB D8C4A98C 50372114 0F0A0F16
273C578F AFD5DCE4 F1F8EFDF CAB29347 2E1A0C06 03071220 364E97B8 D2ECF1F8
EFDFCAB2 93472E1A 0C060307 1220364E 97B8D2EC F1F8EFDF CAB29347 2E1A0C06
03071220 364E97B8 D2E6ECF1 F8EFDFCA B293472E 1A0C0603 07122036 4E97BBD2
ECF1F8EF DFCAB293 472E1A0C 06030712 20364E97 BBD2ECF1 FFFCF5E7 D3B79545
28170801 00040B19 2D4997BB D7E9FFFC F5E7D3B7 95452817 08010004 0B192D49
97BBD7E9 FFFCF5E7 D3B79545 28170801 00040B19 2D4997BB D7E9F7FF FCF5E7D3
```

Professional Software Technologies, Inc. © Copyright 1995

```
B7954528 17080100 040B192D 4997BBD7 E9FFFCF5 E7D3B795 45281708 0100040B
192D4997 BBD7E9FB FAF9EEE0 CBB19448 2F1B0D05 0207111F 354F96B7 D1E5FAF9
EEE0CBB1 9448ZF1B 0D050207 111F354F 96B7D1E5 FAF9EEE0 CBB19448 2F1B0D05
0207111F 354F96B7 D1E5F3FA F9EEE0CB B194482F 1B0D0502 07111F35 4F96B7D1
E5FAF9EE E0CBB194 482F1B0D 05020711 1F354F96 B7D1E5FA F2F6EAD9 C3AB8D4F
3722130E 09101527 3D5790B0 C9EDF2F6 EAD9C3A8 8D4F3722 130E0910 15273D57
90B0C9ED F2F6EAD9 C3AB8D4F 3722130E 09101527 3D5790B0 C9DFEDF2 F6EAD9C3
A88D4F37 22130E09 1015273D 5790B0C9 EDF2F6EA D9C3AB8D 4F372213 0E091015
273D5790 B0C9EDF2 E3E7E2CE BD9F895A 3E2C231C 171F2531 445F8BA5 D4DDE3E7
E2CEBD9F 895A3E2C 231C171F 2531445F 8BA5D4DD E3E7E2CE BD9F895A 3E2C231C
171F2531 445F8BA5 C1D4DDE3 E7E2CEBD 9F895A3E 2C231C17 1F253144 5F8BA5D4
DDE3E7E2 CEBD9F89 5A3E2C23 1C171F25 31445FBB A5D4DDE3 D0D6CCC5 A7998562
533F3830 29333A41 596787AD C0C7D0D6 CCC5A799 8562533F 38302933 3A415967
87ADC0C7 D0D6CCC5 A7998562 533F3830 29333A41 5967879E ADC0C7D0 D6CCC5A7
99856253 3F383029 333A4159 6787ADC0 C7D0D6CC C5A79985 62533F38 3029333A
41596787 ADC0C7D0 B6B9B3AA A18F8268 635D524B 464C565F 656A929C A3AFB6B9
B3AAA18F 8268635D 524B464C 565F656A 929CA3AF B6B9B3AA A18F8268 635D524B
464C565F 656A8492 9CA3AFB6 B9B3AAA1 8F826863 5D524B46 4C565F65 6A929CA3
AFB6B9B3 AAA18F82 68635D52 4B464C56 5F656A92 9CA3AFB6 6D706F6E 77777574
7372716F 6C807F7C 7B7A797E 7D786D70 6F6E7777 75747372 716F6C80 7F7C7B7A
797E7D78 6D706F6E 77777574 7372716F 6C807F7C 7B7F7A79 7E7D786D 706F6E77
77757473 72716F6C 807F7C7B 7A797E7D 786D706F 6E777775 74737271 6F6C807F
7C7B7A79 7E7D786D 4A474D55 5F666B91 9DA4AEB5 BAB4ABA2 8E816964 5C514A47
4D555E66 6B919DA4 AEB5BAB4 ABA28E81 69645C51 4A474D55 5E666B91 9DA4AEB5
BAB4ABA2 9A8E8169 645C514A 474D555E 666B919D A4AEB5BA B4ABA2BE 8169645C
514A474D 555E666B 919DA4AE B5BAB4AB A28E8169 645C514A 2F2A343B 42586787
ACBFC7CF D7CDC6A7 98866154 40392F2A 343B4258 6787ACBF C7CFD7CD C6A79886
61544039 2F2A343B 42586787 ACBFC7CF D7CDC6BF A7988661 5440392F 2A343B42
586787AC BFC7CFD7 CDC6A798 86615440 392F2A34 3B425867 87ACBFC7 CFD7CDC6
A7988661 5440392F 1D181E26 3243608A A6D5DCE4 E8E1CFBC A0885B3F 2B241D18
1E263243 608AA6D5 DCE4E8E1 CFBCA088 5B3F2B24 1D181E26 3243608A A6D5DCE4
E8E1DACF BCA0885B 3F2B241D 181E2632 43608AA6 D5DCE4E8 E1CFBCA0 885B3F2B
241D181E 26324360 8AA6D5DC E4E8E1CF BCA0885B 3F2B241D 0F0A0F16 273C578F
AFC8ECF1 F7EBD3C4 A98C5037 21140F0A 0F16273C 578FAFCB ECF1F7EB D8C4A98C
50372114 0F0A0F16 273C578F AFC8ECF1 F7EFEBD8 C4A98C50 3721140F 0A0F1627
3C578FAF CEECF1F7 EBD8C4A9 8C503721 140F0A0F 16273C57 8FAFC8EC F1F7EBD8
C4A98C50 3721140F 06030712 20364E97 B8D2E6FB F8EFDFCA B293472E 1A0C0603
07122036 4E97B8D2 E6FBF8EF DFCAB293 472E1A0C 06030712 20364E97 B8D2E6FB
FDF8EFDF CAB29347 2E1A0C06 03071220 364E97B8 D2E6FBF8 EFDFCAB2 93472E1A
0C060307 1220364E 97B8D2E6 FBF8EFDF CAB29347 2E1A0C06 0100040B 192D4997
BBD7E9FF FCF5E7D3 B7954528 17080100 040B192D 4997BBD7 E9FFFCF5 E7D3B795
45281708 0100040B 192D4997 BBD7E9FA FFFCF5E7 D3B79545 28170801 00040B19
2D4997BB D7E9FFFC F5E7D3B7 95452817 08010004 0B192D49 97BBD7E9 FFFCF5E7
D3B79545 28170801 05020711 1F354F96 B7D1EDF2 F9EEE0CB B194482F 1B0D0502
07111F35 4F96B7D1 EDF2F9EE E0CBB194 482F1B0D 05020711 1F354F96 B7D1EDF2
F6F9EEE0 CBB19448 2F1B0D05 0207111F 354F96B7 D1EDF2F9 EEE0CBB1 94482F1B
0D050207 111F354F 96B7D1ED F2F9EEE0 CBB19448 2F1B0D05 0E091015 273D5790
B0D4DDE3 E7EAD9C3 A88D4F37 22130E09 1015273D 5790B0D4 DDE3E7EA D9C3A88D
4F372213 0E091015 273D5790 B0D4DDE3 E7E2EAD9 C3AB8D4F 3722130E 09101527
3D5790B0 D4DDE3E7 EAD9C3A8 8D4F3722 130E0910 15273D57 90B0D4DD E3E7EAD9
C3AB8D4F 3722130E 1C171F25 31445FBB ADC0C7D0 D6CCCEBD 9F895A3E 2C231C17
1F253144 5F8BADC0 C7D0D6CC CEBD9F89 5A3E2C23 1C171F25 31445F8B ADC0C7D0
D6CCC5CE BD9F895A 3E2C231C 171F2531 445FBBAD C0C7D0D6 CCCEBD9F 895A3E2C
231C171F 2531445F 8BADC0C7 D0D6CCCE BD9FB95A 3E2C231C 3029333A 41596792
9CA3AFB6 B9B3AAA7 99856253 3F383029 333A4159 67929CA3 AFB6B9B3 AAA799B5
62533F38 3029333A 41596792 9CA3AFB6 B9B3AAA1 A7998562 533F3830 29333A41
5967929C A3AFB6B9 B3AAA799 8562533F 38302933 3A415967 929CA3AF B6B9B3AA
A7998562 533F3830 4B464C56 5F657A79 7E7D786D 706F6E77 8F826863 5D524B46
```

Professional Software Technologies, Inc. © Copyright 1995

```
4C565F65 7A797E7D 786D706F 6E778FB2 68635D52 4B464C56 5F657A79 7E7D786D
706F6E77 778FB268 635D524B 464C565F 657A797E 7D786D70 6F6E778F B268635D
524B464C 565F657A 797E7D78 6D706F6E 778FB268 635D524B 6F6CB07F 7CBEB169
645C514A 474D555E 66757473 72716F6C B07F7CBE 8169645C 514A474D 555E6675
74737271 6F6CB07F 7CBEB169 645C514A 474D555E 666B7574 7372716F 6CB07F7C
8EB16964 5C514A47 4D555E66 75747372 716F6CB0 7F7CBE81 69645C51 4A474D55
5E667574 7372716F B5BAB4AB A79BB661 5440392F 2A343B42 5867919D A4AEB5BA
B4ABA798 B6615440 392F2A34 3B425867 919DA4AE B5BAB4AB A79BB661 5440392F
2A343B42 5B678791 9DA4AEB5 BAB4ABA7 98B66154 40392F2A 343B4258 67919DA4
AEB5BAB4 ABA798B6 61544039 2F2A343B 42586791 9DA4AEB5 CFD7CDCF BCA0B85B
3F2B241D 181E2632 43608AAC BFC7CFD7 CDCFBCA0 885B3F2B 241D181E 26324360
8AACBFC7 CFD7CDCF BCA0B85B 3F2B241D 181E2632 43608AA6 ACBFC7CF D7CDCFBC
A0B85B3F 2B241D1B 1E263243 608AACBF C7CFD7CD CFBCA0B8 5B3F2B24 1D181E26
3243608A ACBFC7CF E4E8EBD8 C4A98C50 3721140F 0A0F1627 3C57BFAF D5DCE4E8
EBD8C4A9 BC503721 140F0A0F 16273C57 BFAFD5DC E4E8EBD8 C4A98C50 3721140F
0A0F1627 3C57BFAF C8D5DCE4 E8EBDBC4 A9BC5037 21140F0A 0F16273C 57BFAFD5
DCE4EBEB D8C4A9BC 50372114 0F0A0F16 273C57BF AFD5DCE4 F1F8EFDF CAB29347
2E1A0C06 03071220 364E97B8 D2ECF1F8 EFDFCAB2 93472E1A 0C060307 1220364E
97BBD2EC F1F8EFDF CAB29347 2E1A0C06 03071220 364E97B8 D2E6ECF1 F8EFDFCA
B293472E 1A0C0603 07122036 4E97BBD2 ECF1F8EF DFCAB293 472E1A0C 06030712
20364E97 B8D2ECF1 FFFCF5E7 D3B79545 28170B01 00040B19 2D4997BB D7E9FFFC
F5E7D3B7 95452817 08010004 0B192D49 97BBD7E9 FFFCF5E7 D3B79545 28170B01
00040B19 2D4997BB D7E9F7FF FCF5E7D3 B7954528 17080100 040B192D 4997BBD7
E9FFFCF5 E7D3B795 45281708 0100040B 192D4997 BBD7E9FA
```

APPENDIX "C"

Professional Software Technologies, Inc. © Copyright 1995

```c
#ifndef _SCREEN_H
define _SCREEN_H static char sccsid_screen_h__[]="%W%    %G% %U%    %Q% %Y%";

define  PRT_BRICK typedef struct
{
      long   s_class;

long   num;
} scrDot;

typedef struct
{
      long   class_max;

long*  num_in_class;

char***    dot_name;
      */

} scrDotTable;

#ifdef  PRT_BRICK
#include "all.h"

typedef struct
{
      s32 a,b,m;
      s32 width,depth;
      s32 area,stagger;
} BRICK;

typedef struct
{
    BRICK         brick;
    u8            *data;
    scrDotTable   my_DotTable;
    s32           yellow_ruling_ratio;
    s32           fm_scale;
    BOOL          flip;
    BOOL          dot_centred;
    char          ripdir[128];
} Hidden;
endif typedef long scrRosetteCentre;

define scrRosetteCentre_Clear     0
define scrRosetteCentre_Dot    1 typedef long scrYellowRulingRatio;

define scrYRR_High        0
#define scrYRR_Medium    1
#define scrYRR_Low             2
```

C 1

Professional Software Technologies, Inc. © Copyright 1995

```
typedef long scrErr;

#define scrErr_OK                       0
#define scrErr_NoMemory                 1
#define scrErr_BadRect                  2
#define scrErr_NoScdata                 3
#define scrErr_BadSetscreen             4
#define scrErr_BadDotData               5
#define scrErr_BadRosetteCentre         6
#define scrErr_BadYellowRulingRatio     7
#define scrErr_RipDirNameTooLong        8
define scrErr_BadFMScale               9 typedef struct
{
      long    top;
      long    left;
      long    bottom;
      long    right;
} scrRect;

typedef struct
{
      unsigned char*   dataPtr;
      scrRect*         location;
      double           angle;
      double           frequency;
      double           resolution;
      scrDot           dotShape;
      long             positive;
      long*            outDataSize;
#ifndef  PRT_BRICK
      void*            forHyphenUse;
#else
      Hidden*          forHyphenUse;
#endif
} scrControl;

#if 0
scrErr InitScreening();
scrErr SetScreen();
scrErr ScreenBlock();
scrErr EndScreening();

scrErr SetHyphenAMRosetteCentre();
scrErr SetHyphenAMYellowRulingRatio();
```

C 2

Professional Software Technologies, Inc. © Copyright 1995

```
scrErr SetHyphenFMScale();
scrErr SetHyphenFlip();
#else
scrErr InitScreening(scrControl*, scrDotTable*, char*);
scrErr SetScreen(scrControl*);
scrErr ScreenBlock(scrControl*);
scrErr EndScreening(scrControl*, scrDotTable*);

scrErr SetHyphenAMRosetteCentre(scrControl*, scrRosetteCentre);
scrErr SetHyphenAMYellowRulingRatio(scrControl*, scrYellowRulingRatio);
scrErr SetHyphenFMScale(scrControl*, long);
scrErr SetHyphenFlip(scrControl*, long);

endif endif
```

C 3

Professional Software Technologies, Inc. © Copyright 1995

Professional Software Technologies, Inc. © Copyright 1995
static char sccsid[]="%W%     %G% %U%     %Q% %Y%";

```c
#include <iostream.h>
#include <assert.h>
#include <string.h>
#include "scrn_it.h"
#include "screening.h"

#if !defined(VER_1) && !defined(VER_2)
#define VER_1 0
#define VER_2 1
#endif // !defined(VER_1) && !defined(VER_2)

#ifndef DEBUG_SCREEN
#if VER_2
#define DEBUG_SCREEN 0
#else
#undef DEBUG_SCREEN
#endif // VER_2
endif // DEBUG_SCREEN extern "C"
{
    #include "screen.h"
#if DEBUG_SCREEN
    #include "screen_debug.h"

int screen_debug;
#endif // DEBUG_SCREEN
};

int SetBit(unsigned long& x, int n);
int ResetBit(unsigned long& x, int n);

ScrnBlock::ScrnBlock(scrRect& sLoc, int pix, int lin)
    : pixels(pix), lines(lin), sRect(sLoc)
{
    sRect.top = 0;
    sRect.bottom = lines-1;
} void ScrnBlock::set(long left)
{
    // cerr << "ScrnBlock::set(" << left << ") called" << endl;

this->operator=(left);
} void ScrnBlock::next()
{
    // cerr << "ScrnBlock::next() called" << endl;

(*this)++;
} void ScrnBlock::operator=(long left)
{
```

C 5

Professional Software Technologies, Inc. © Copyright 1995

```
        // cerr << "ScrnBlock::operator=(" << left << ") called" << endl;

// all coordinates are zero-based!
        sRect.left  = left;
        sRect.right = left + pixels - 1;
} void ScrnBlock::operator++()
{
        // cerr << "ScrnBlock::operator++() called" << endl;

sRect.top    += lines;
        sRect.bottom += lines;
} const ostream& operator<<(ostream& s, const ScrnBlock& sBlock)
{
        // s.precision(6);

unsigned char *p = (unsigned char *)&sBlock;
        // fprintf(stderr, "%d\n", p);
        // s << hex << p << endl;

s << "left:  "   << sBlock.sRect.left   << "\t";
        s << "right: "   << sBlock.sRect.right  << "\t";
        s << "top:   "   << sBlock.sRect.top    << "\t";
        s << "bottom: "  << sBlock.sRect.bottom;

return s << flush;
} const ostream& operator<<(ostream& s, const ScrnBlock* sBlock)
{
        s << (*sBlock);

return s;
} void ScrnBlock::dump(const ostream& s) const
{
        (ostream& )s << this << endl;
}

Screening::Screening(const ScrnProcessor& sp, long slines, int positive/*=1*/)
        : scrn_lines(slines)
{
#if DEBUG_SCREEN
#if 1
        screen_debug = SCREEN_DEBUG_SETSCREEN_REQUEST |
                                SCREEN_DEBUG_SETSCREEN_FILE |
                                SCREEN_DEBUG_SETSCREEN_DATA |
                                SCREEN_DEBUG_INITSCREENING |
                                SCREEN_DEBUG_SCREENBLOCK_CONTONE_DATA |
                                SCREEN_DEBUG_SCREENBLOCK_OUTPUT_DATA |
                                SCREEN_DEBUG_SCREENBLOCK_THRESHOLD_DATA;
#else
        screen_debug = SCREEN_DEBUG_SCREENBLOCK_OUTPUT_DATA;
```

C 6

Professional Software Technologies, Inc. © Copyright 1995
endif // 0
endif // DEBUG_SCREEN

```
      sfail = 0;

scrFun = new char[255];
      ::strcpy(scrFun, "");

sControl = new scrControl;
      sControl->dataPtr = new unsigned char[scrn_lines*(sp.pixels+sp.bpixel)];
      sControl->outDataSize = new long;
      *sControl->outDataSize = 0;
      sControl->location = new scrRect;

sDotTable = new scrDotTable;

sBlock = new ScrnBlock(*sControl->location, sp.pixels+sp.bpixel,scrn_lines);
      // sBlock->dump();

sControl->positive = positive;

*sBlock = 0;

// sBlock->dump();

// cerr << "calling InitScreening()" << endl;
#if VER_1
      sfail = ::InitScreening(sControl, sDotTable);
#endif // VER_1
#if VER_2
      // sfail = ::InitScreening(sControl, sDotTable, NULL);
      sfail = ::InitScreening(sControl, sDotTable, "/usr/hyphen/rip");
#endif // VER_2
      if (sfail)
      {
            ::strcpy(scrFun, "InitScreening");
            return;
      } if 1
      if (!sfail && miscOpt.get(debug))
            table_dump();
endif // 0 sfail = set(sp);
}

Screening::Screening(const MScrnProcessor& sp, long slines,
            int positive        int s
      : scrn_lines(slines)
{
#if DEBUG_SCREEN
#if 1
      screen_debug = SCREEN_DEBUG_SETSCREEN_REQUEST |
                             SCREEN_DEBUG_SETSCREEN_FILE |
                             SCREEN_DEBUG_SETSCREEN_DATA |
                             SCREEN_DEBUG_INITSCREENING |
                             SCREEN_DEBUG_SCREENBLOCK_CONTONE_DATA |
                             SCREEN_DEBUG_SCREENBLOCK_OUTPUT_DATA |
                             SCREEN_DEBUG_SCREENBLOCK_THRESHOLD_DATA;
#else
```

Professional Software Technologies, Inc. © Copyright 1995

```
        screen_debug = SCREEN_DEBUG_SCREENBLOCK_OUTPUT_DATA;
#endif // 0
endif // DEBUG_SCREEN sfail = 0;

scrFun = new char[255];
        ::strcpy(scrFun, "");

sControl = new scrControl;
        sControl->dataPtr = new unsigned char[scrn_lines*(sp.pixels+sp.bpixel)];
        sControl->outDataSize = new long;
        *sControl->outDataSize = 0;
        sControl->location = new scrRect;

sDotTable = new scrDotTable;

sBlock = new ScrnBlock(*sControl->location, sp.pixels+sp.bpixel,scrn_lines);
        // sBlock->dump();

sControl->positive = positive;

*sBlock = 0;

// sBlock->dump();

// cerr << "calling InitScreening()" << endl;
#if VER_1
        sfail = ::InitScreening(sControl, sDotTable);
#endif // VER_1
#if VER_2
        // sfail = ::InitScreening(sControl, sDotTable, NULL);
        sfail = ::InitScreening(sControl, sDotTable, "/usr/hyphen/rip");
#endif // VER_2
        if (sfail)
        {
                ::strcpy(scrFun, "InitScreening");
                return;
        } if 1
        if (!sfail && miscOpt.get(debug))
                table_dump();
endif // 0 sfail = set(sp, s);
}

Screening::~Screening()
{
        delete[] scrFun;

sfail = ::EndScreening(sControl, sDotTable);
        if (sfail)
                ::strcpy(scrFun, "EndScreening");

delete sDotTable;

delete sControl->location;
        delete sControl->outDataSize;
        delete []sControl->dataPtr;
        delete sControl;
```

Professional Software Technologies, Inc. © Copyright 1995
}

```cpp
int Screening::set(const ScrnProcessor& sp)
{
#if VER_2
    //  sfail = ::SetHyphenAMRosetteCentre(sControl, scrRosetteCentre_Clear);
    sfail = ::SetHyphenAMRosetteCentre(sControl, scrRosetteCentre_Dot);
    // assert(sfail==0);
    if (sfail)
    {
        ::strcpy(scrFun, "SetHyphenAMRosetteCentre");
        return sfail;
    } sfail = ::SetHyphenAMYellowRulingRatio(sControl, scrYRR_Low);
    // assert(sfail==0);
    if (sfail)
    {
        ::strcpy(scrFun, "SetHyphenAMYellowRulingRatio");
        return sfail;
    }
endif // VER_2 sControl->angle = sp.s_ang;
    // sControl->angle = 5;
    sControl->frequency = sp.s_freq;
    // sControl->frequency = 33;
    sControl->resolution = sp.s_res;

sControl->dotShape.s_class = sp.s_class;
    sControl->dotShape.num = sp.s_dot;

cerr<< "before SetScreening()" << endl; dump();

// cerr << "calling SetScreening()" << endl;
    sfail = ::SetScreen(sControl);
    // assert(sfail==0);
    if (sfail)
        ::strcpy(scrFun, "SetScreen");

return sfail;
} int Screening::inc()
{
    sControl->angle += 5;
    if (sControl->angle>90)
        sControl->angle = 15;

sControl->frequency += 15;
    if (sControl->frequency>175)
        sControl->frequency = 33;

sControl->dotShape.num++;
    if (sControl->dotShape.num>=3)
        sControl->dotShape.num=0;

// cerr << "calling SetScreening()" << endl;
    sfail = ::SetScreen(sControl);
    // assert(sfail==0);
    if (sfail)
```

C 9

Professional Software Technologies, Inc. © Copyright 1995

```cpp
        ::strcpy(scrFun, "SetScreen");

return sfail;
} void Screening::process()
{
    // inc();

if (!sfail && miscOpt.get(debug))
    {
        // sBlock->dump();
        control_dump();
    }

// cerr << "calling ScreeningBlock()" << endl;
    sfail = ::ScreenBlock(sControl);
    if (sfail)
        ::strcpy(scrFun, "ScreenBlock");

// sBlock->dump();

(*sBlock)++;
} void Screening::process(unsigned char* buf, long line, long spixel, long epixel)
{
    sControl->dataPtr = buf;

sControl->location->top = line;
    sControl->location->bottom = line;
    sControl->location->left = spixel;
    sControl->location->right = epixel;

process();
} int Screening::get_siz() const
{
    return scrn_lines;
} int Screening::buf_siz() const
{
    return *sControl->outDataSize;
} unsigned char* Screening::get_buf() const
{
    return sControl->dataPtr;
} const char *const Screening::sqr = "square";
const char *const Screening::rsr = "round-square-round";
const char *const Screening::chain = "chain";
const char *const Screening::elp = "ellipitical";
```

C 10

Professional Software Technologies, Inc. © Copyright 1995

```cpp
const char *const Screening::rnd = "round";
const char *const Screening::flexo = "flexo";

void Screening::set_dot(int& s_class, int& s_dot, const char *name) const
{
        s_class = s_dot = 0;

char key[255];
        if (!strcmp(name, rsr))
                strcpy(key, "TV.a");
        else if (!strcmp(name, chain) || !strcmp(name, elp))
                strcpy(key, "CHAIN.a");
        else
        {
                cerr << "screen dot shape " << name << " not supported yet" << endl;

return;
        } for (int i=0; i<sDotTable->class_max; i++)
                for (int j=0; j<sDotTable->num_in_class[i]; j++)
                {
                        if (!strcmp(sDotTable->dot_name[i][j], key))
                        {
                                s_class=i, s_dot = j;
                                return;
                        }
                } assert(0);
} int Screening::set(const MScrnProcessor& sp, int s)
{
#if VER_2
        // sfail = ::SetHyphenAMRosetteCentre(sControl, scrRosetteCentre_Clear);
        sfail = ::SetHyphenAMRosetteCentre(sControl, scrRosetteCentre_Dot);
        // assert(sfail==0);
        if (sfail)
        {
                ::strcpy(scrFun, "SetHyphenAMRosetteCentre");
                return sfail;
        } sfail = ::SetHyphenAMYellowRulingRatio(sControl, scrYRR_Low);
        // assert(sfail==0);
        if (sfail)
        {
                ::strcpy(scrFun, "SetHyphenAMYellowRulingRatio");
                return sfail;
        }
endif // VER_2 sControl->angle = sp.ms_ang[s];
        // sControl->angle = 5;
        sControl->frequency = sp.ms_freq[s];
        // sControl->frequency = 33;
        sControl->resolution = sp.ms_res[s];

sControl->dotShape.s_class = sp.ms_class[s];
        sControl->dotShape.num = sp.ms_dot[s];
```

Professional Software Technologies, Inc. © Copyright 1995

```
      cerr<< "before SetScreening()" << endl; dump();

// cerr << "calling SetScreening()" << endl;
      sfail = ::SetScreen(sControl);
      // assert(sfail==0);
      if (sfail)
            ::strcpy(scrFun, "SetScreen");

return sfail;
} void Screening::control_dump(ostream& s                    const
{
      s << "location: " << sBlock << "\n";

s << "angle:      " << sControl->angle << "\t";
      s << "frequency:  " << sControl->frequency << "\t";
      s << "resolution: " << sControl->resolution << "\n";

int s_class = sControl->dotShape.s_class;
      int s_dot   = sControl->dotShape.num;

s << "dotshape:   " << s_class << ", " << s_dot;
      s << " (" << sDotTable->dot_name[s_class][s_dot] << ")" << "\n";

s << "positive:   " << sControl->positive << "\n";

s << "outDataSize:     " << *sControl->outDataSize << "\n";
} void Screening::table_dump(ostream& s                      const
{
      s << "class_max: " << sDotTable->class_max << "\n";
      for (int i=0; i<sDotTable->class_max; i++)
      {
            s << "num_in_class[" << i << "] - " << sDotTable->num_in_class[i];
            s << "\n";

for (int j=0; j<sDotTable->num_in_class[i]; j++)
            {
                  s << "dot_name[" << i << "][" << j << "] - ";
                  s << sDotTable->dot_name[i][j] << "\n";
            }
      }
} void Screening::print_status(int id) const
{
} const ostream& operator<<(ostream& s, const Screening& scrn)
{
      scrn.table_dump(s);

scrn.control_dump(s);

s << "scrn_lines: " << scrn.scrn_lines;

return s;
}
```

C 12

Professional Software Technologies, Inc. © Copyright 1995

```cpp
const ostream& operator<<(ostream& s, const Screening* scrn)
{
        s << (*scrn);

return s;
} void Screening::dump(const ostream& s) const
{
        (ostream& )s << this << endl;
} int Screening::operator!() const
{
        return sfail;
} int Screening::print_error() const
{
        switch (sfail)
        {
                case 0:
                        break;
                case 1:
                        cerr << programName <<  ": screen lib[" << scrFun << "()] - "
                                                        "malloc failed" << endl;
                        break;
                case 2:
                        cerr << programName <<  ": screen lib[" << scrFun << "()] - "
                                                        "invalid rectangle size" << endl;
                        break;
                case 3:
                        cerr << programName <<  ": screen lib[" << scrFun << "()] - "
                                                        "couldn't open scdata file" << endl;
                        break;
                case 4:
                        cerr << programName <<  ": screen lib[" << scrFun << "()] - "
                                        "invalid or un-supported res, ang, freq combination" <<endl;
                        break;
                case 5:
                        cerr << programName <<  ": screen lib[" << scrFun << "()] - "
                                        "error in the dot data provided at install time" << endl;
                        break;
                case 6:
                        cerr << programName <<  ": screen lib[" << scrFun << "()] - "
                                        "invalid scrRosetteCentre value" << endl;
                        break;
                case 7:
                        cerr << programName <<  ": screen lib[" << scrFun << "()] - "
                                        "invalid scrYellowRulingRatio value" << endl;
                        break;
                case 8:
                        cerr << programName <<  ": screen lib[" << scrFun << "()] - "
                                        "RIP directory name exceeded 127 characters" << endl;
                        break;
                default:
```

Professional Software Technologies, Inc. © Copyright 1995

```
                cerr << programName << ": screen lib[" << scrFun << "()] - "
                             "unknown error!" << endl;
                break;
        } return sfail;
}

MScreening::MScreening(const MScrnProcessor& s, short num_scrn, int positive)
        : num_screen(num_scrn)
{
        inbuf = outbuf = sbuf = 0;

assert(num_scrn>0);

screening = new Screening* [num_scrn];
        for (int i=0; i<num_screen; i++)
        {
                cur_screen = i;

screening[i] = new Screening(s, 1, positive, i);
                if (!(*screening[i]))
                {
                        // sfail = 1;
                        break;
                }
        }
}

MScreening::~MScreening()
{
        delete[] inbuf;
        delete[] outbuf;
        delete[] sbuf;

for (int i=0; i<num_screen; i++)
                delete screening[i];
        delete[] screening;
} void MScreening::init_buf(long siz)
{
        inbuf  = new unsigned char[siz];
        outbuf = new unsigned char[siz];

sbuf = new unsigned char[siz];

::memset(outbuf, 0, siz);
} unsigned char* MScreening::get_ibuf() const
{
        return inbuf;
}
```

C 14

Professional Software Technologies, Inc. © Copyright 1995

```
unsigned char* MScreening::get_obuf() const
{
      return outbuf;
}

Screening* MScreening::operator[](int s)
{
      return screening[s];
} int MScreening::print_error() const
{
      assert(cur_screen>=0);
      assert(cur_screen<num_screen);

return screening[cur_screen]->print_error();
} void MScreening::process(const unsigned char *const pstbuf,
      long line, long pixels)
{
      unsigned char *sp = sbuf;

// if (line>=500)
            // cerr << "here I am!" << endl;

#if 1
      register STP* stp = (STP*)pstbuf;
      register int s = stp->screen;
      register long length=0;
      register long p=0;
      long pstart, plen;
      long buf_start, buf_end;

pstart = 0;

int done = 0;
      while (!done)
      {
            if ((p<pixels) && (s == stp->screen))
            {
                  length += stp->length;
                  p += stp->length;
            }
            else
            {
                  buf_start = (pstart%32==0)? pstart: pstart - pstart%32;
                  assert(buf_start>=0);

buf_end = ((pstart+length)%32==0)?
                              pstart+length-1: pstart+length-1+32-
(pstart+length)%32;
                  plen = buf_end-buf_start+1;

if (p<pixels)
                  {
                        cerr << "screen: " << s;
                        cerr << " pstart: " << pstart;
```

Professional Software Technologies, Inc. © Copyright 1995

```
                        cerr << " length:" << length;
                        cerr << " buf_start: " << buf_start;
                        cerr << " buf_end: " << buf_end;
                        cerr << " plen:" << plen << endl;
                    } assert(pstart>=0);
                    assert((pstart-buf_start)>=0);

::memcpy(sp+pstart-buf_start, inbuf+pstart, plen);
                    screening[s]->process(sp, line, buf_start, buf_end);
                    bitmemcpy(outbuf, (long)pstart, sp, (long)(pstart-buf_start),
plen);

//  ::memset(outbuf, 16, length/8);
                    //  ::memcpy(outbuf, sp, length/8);

if (p==pixels)
                    {
                        done = 1;
                        continue;
                    } pstart += length;
                    pstart++;

s = stp->screen;
                    length = stp->length;
                    p += stp->length;
                } stp++;
        }
#endif // 0
} int MScreening::operator!() const
{
        assert(cur_screen>=0);
        assert(cur_screen<num_screen);

return !(*screening[cur_screen]);
} int MScreening::buf_siz() const
{
        assert(cur_screen>=0);
        assert(cur_screen<num_screen);

return screening[cur_screen]->buf_siz();
} unsigned char* MScreening::get_sbuf() const
{
        assert(cur_screen>=0);
        assert(cur_screen<num_screen);

return screening[cur_screen]->get_buf();
}
```

C 16

Professional Software Technologies, Inc. © Copyright 1995

```
int SetBit(unsigned long& x, int n)
{
        if (n<0)
              cerr << "SetBit::n " << n << endl;

assert(n>=0);
        assert(n<sizeof(int)*8);

return x |= 1<< n;
} int ResetBit(unsigned long& x, int n)
{
        assert(n>=0);
        assert(n<sizeof(int)*8);

// cerr << "x: " << x << endl;
        return x &= ~(1<<n);
        // x = 1;
} void MScreening::bitmemcpy(const unsigned char* dst, long dstbit,
        const unsigned char *const src, long srcbit, int bitlen)
{
        long bs;
        long bd;
        long *s;
        long *d;
        long sbit;
        long dbit;

assert(srcbit>=0);
        assert(dstbit>=0);
        assert(bitlen>0);

bs = srcbit/(sizeof(unsigned long)*8);
        bd = dstbit/(sizeof(unsigned long)*8);

s = (long*)(src+bs);
        d = (long*)(dst+bd);

sbit = srcbit % (sizeof(long)*8);
        dbit = dstbit % (sizeof(long)*8);

for (register int i=0; i<bitlen; i++)
        {
              assert(sbit>=0);
              assert(sbit<32);
              assert(dbit>=0);
              assert(dbit<32);

if (::testbit(*s, sbit))
                    ::SetBit(*d, dbit);
              else
                    ::ResetBit(*d, dbit);

#define BIT_DEC
#ifdef BIT_DEC
              if (--sbit<0)
                    s++, sbit=sizeof(long)*8-1;
              if (--dbit<0)
```

C 17

Professional Software Technologies, Inc. © Copyright 1995

```
                d++, dbit=sizeof(long)*8-1;
#else
            if (++sbit>(sizeof(long)*8-1))
                s++, sbit=0;
            if (++dbit>(sizeof(long)*8-1))
                d++, dbit=0;
#endif // BIT_DEC
      }
} void MScreening::dump(ostream& s) const
{
      s << "============" << endl;

s << "MScreening - num_screen: " << num_screen << endl;

for (int i=0; i<num_screen; i++)
      {
            s << "screening " << i << endl;
            s << *screening[i] << endl;
      }
      s << "============" << endl;
}
```

Professional Software Technologies, Inc. © Copyright 1995

```
#ifndef __screening_h__
define __screening_h__ include <iostream.h>
include <FilePath.h>
#include "task.h"
#include "scrnpst.h"

extern "C"
{
    #include "screen.h"
} class ScrnProcessor;
class Screening;
class MScreening;

class ScrnBlock
{
public:
    ScrnBlock(scrRect&, int pix, int lin);
    ~ScrnBlock();

void set(long left);
    void next();

void operator=(long left);
    void operator++();
    friend const ostream& operator<<(ostream&, const ScrnBlock&);
    friend const ostream& operator<<(ostream&, const ScrnBlock*);

void dump(const ostream& s = clog) const;
private:
    int pixels, lines;          // size of rect
    scrRect& sRect;
};

class Screening: public Task
{
public:
    Screening(const ScrnProcessor&, long scrn_lines, int positive=1);
    Screening(const MScrnProcessor&, long scrn_lines, int positive=1, int s=0);
    ~Screening();

static const char *const sqr;
    static const char *const rsr;
    static const char *const chain;
    static const char *const elp;
    static const char *const rnd;
    static const char *const flexo;
```

Professional Software Technologies, Inc. © Copyright 1995

```
      int sfail;

int set(const ScrnProcessor&);
      int set(const MScrnProcessor&, int s);
      int inc();
      void process();
      void process(unsigned char* buf, long line, long spixel, long epixel);

void print_status(int id) const;
      int operator!() const;
      int get_siz() const;
      int buf_siz() const;
      unsigned char *get_buf() const;
      void set_dot(int& s_class, int& s_dot, const char *const name) const;

friend const ostream& operator<<(ostream&, const Screening&);
      friend const ostream& operator<<(ostream&, const Screening*);
      virtual void dump(const ostream& s = clog) const;

virtual int print_error() const;
      void control_dump(ostream& s=cerr) const;
      void table_dump(ostream& s=cerr) const;

private:
      long scrn_lines;

scrControl* sControl;
      scrDotTable* sDotTable;

ScrnBlock* sBlock;

char *scrFun;
};

class MScreening: public Task
{
public:
      MScreening(const MScrnProcessor&, short num_screen, int positive=1);
      virtual ~MScreening();

void process(const unsigned char* const pstbuf, long line, long pixels);
      Screening* operator[](int);
      int operator!() const;
      int buf_siz() const;
      void init_buf(long siz);
      unsigned char *get_sbuf() const;
      unsigned char *get_ibuf() const;
      unsigned char *get_obuf() const;

// virtual void dump(const ostream& s = clog) const;
      virtual int print_error() const;
      void dump(ostream& s = clog) const;

private:
      // int sfail;

long num_screen;
      int cur_screen;
```

C 20

Professional Software Technologies, Inc. © Copyright 1995

```
    Screening** screening;

unsigned char *inbuf, *outbuf, *sbuf;
    void bitmemcpy(const unsigned char* dst, long dstbit,
                   const unsigned char *const src, long srcbit, int bitlen);
};

#endif // __screening_h__
```

Professional Software Technologies, Inc. © Copyright 1995

```
    int sfail;

int set(const ScrnProcessor&);
    int set(const MScrnProcessor&, int s);
    int inc();
    void process();
    void process(unsigned char* buf, long line, long spixel, long epixel);

void print_status(int id) const;
    int operator!() const;
    int get_siz() const;
    int buf_siz() const;
    unsigned char *get_buf() const;
    void set_dot(int& s_class, int& s_dot, const char *const name) const;

friend const ostream& operator<<(ostream&, const Screening&);
    friend const ostream& operator<<(ostream&, const Screening*);
    virtual void dump(const ostream& s = clog) const;

virtual int print_error() const;
    void control_dump(ostream& s=cerr) const;
    void table_dump(ostream& s=cerr) const;

private:
    long scrn_lines;

scrControl* sControl;
    scrDotTable* sDotTable;

ScrnBlock* sBlock;

char *scrFun;
};

class MScreening: public Task
{
public:
    MScreening(const MScrnProcessor&, short num_screen, int positive=1);
    virtual ~MScreening();

void process(const unsigned char* const pstbuf, long line, long pixels);
    Screening* operator[](int);
    int operator!() const;
    int buf_siz() const;
    void init_buf(long siz);
    unsigned char *get_sbuf() const;
    unsigned char *get_ibuf() const;
    unsigned char *get_obuf() const;

// virtual void dump(const ostream& s = clog) const;
    virtual int print_error() const;
    void dump(ostream& s = clog) const;

private:
    // int sfail;

long num_screen;
    int cur_screen;
```

C 20

Professional Software Technologies, Inc. © Copyright 1995

```
        s32 a[6], b[6], m[6];
        float pixels_per_spot;
} ABMSEX_TAB;

static ABMSEX_TAB *abmsex_tab=NULL, *abmsex_offset_tab=NULL;
static s32 *fma_tab=NULL, *fmm_tab=NULL;
static u8 *scdata_buffer=NULL;

typedef enum
{
        degrees_15,
        degrees_45,
        degrees_75,
        degrees_0
} ROSDEF_ANGLE;

char *to_base(val,result)
s32 val;
char *result;
{
        static char *baseconv =
                "0123456789abcdefghijklmnopqrstuvwxyz$#&@!%()-{}_'`^~";
        s32 num;

val %= (DBASE*DBASE*DBASE);
        num = val/(DBASE*DBASE);
        val -= num*(DBASE*DBASE);
        result[0] = baseconv[num];
        num = val/DBASE;
        val -= num*DBASE;
        result[1] = baseconv[num];
        result[2] = baseconv[val];
        result[3] = NUL;
        return(result);
} char *to_base_dot(val, result)
s32 val;
char *result;
{
        static char *baseconv1 =
                "sabcdefghijklmnopqrtuvwxyz0123456789$#&@!%()-{}_'`^~";
        static char *baseconv2 =
                "abcdefghijklmnopqrstuvwxyz0123456789$#&@!%()-{}_'`^~";
        s32 num;

val %= DBASE*DBASE;
        num = val/DBASE;
        val %= DBASE;
        result[0] = baseconv1[num];
        result[1] = baseconv2[val];
        result[2] = NUL;
        return(result);
} make_dotdir_name(aa,bb,mm,ss,string,ripdir)
s32   aa,bb,mm,ss;
u8 *string,*ripdir;
{
        u8 d[3],a[4],b[4],m[4];

sprintf(string,"%s/dotdir/%s%s%s.%s",ripdir,
```

C 23

Professional Software Technologies, Inc. © Copyright 1995

```
            to_base_dot(ss,d),
            to_base(aa,a),
            to_base(bb,b),
            to_base(mm,m));
} encrypt(data, data_len, screenid)
u8 *data;
s32 data_len, screenid;
{
        register s32            i, j;
        register u8             *p, *m, *mm;
        static u8       code1[32] = {128+23,14,32,128+73,62,128+57,44,12,34,128+31,
72,14,128+37,128+13,128+39,128+61,128+63,128+97,
                                        128+49,128+85,128+59,128+39,84,38,24,
                                        128+97,128+63,128+33,28,56,12,128+93};
        static u8       code2[32] = {14,32,128+73,62,128+57,44,12,34,128+31,
72,14,128+37,128+13,128+39,128+61,128+63,128+97,
                                        128+49,128+85,128+59,128+39,84,38,24,
128+97,128+63,128+33,28,56,12,128+93,128+23};

if (screenid < DBASE*DBASE/2)
                return;
        else
                mm = code2;

#ifdef DEBUG
        if (screen_debug & SCREEN_DEBUG_SETSCREEN_FILE)
        {
                fprintf(stderr, "SCREEN_DEBUG_SETSCREEN_FILE\n");
                fprintf(stderr, "Decrypting\n");
        }
endif i = data_len;
        p = data;
        j = 32;
        m = mm;

while (i-- != 0)
        {
                *p++ ^= *m++;

if (--j == 0)
                {
                        j = 32;
                        m = mm;
                }
        } return;
} u8 *find_section_header(name)
u8 *name;
{
```

C 24

Professional Software Technologies, Inc. © Copyright 1995
```
        register u8      *ptr;
        s32         name_len;

name_len = strlen(name);
        ptr = (u8 *)scdata_buffer;

while (*ptr != NUL)
        {
                if ((ptr[0] == '%') &&
                    (ptr[1] == '%') &&
                    (!strncmp(name, &(ptr[2]), name_len)))
                {
                        ptr += name_len + 2;

if ((*ptr == CR) || (*ptr == LF))
                        {
                                ptr++;

while ((*ptr == CR) || (*ptr == LF))
                                        ptr++;

return ptr;
                        }
                } while ((*ptr != CR) && (*ptr != LF) && (*ptr != NUL))
                        ptr++;

while ((*ptr == CR) || (*ptr == LF))
                        ptr++;

} return NULL;
}

BOOL find_next_line_in_section(ptr_ptr)
u8 **ptr_ptr;
{
        register u8 *ptr = *ptr_ptr;

while ((*ptr != NUL) && (*ptr != CR) && (*ptr != LF))
                ptr++;

while ((*ptr == CR) || (*ptr == LF))
                ptr++;

*ptr_ptr = ptr;

if ((*ptr == NUL) ||
            ((ptr[0] == '%') && (ptr[1] == '%')))
        {
                return FALSE;
        }
        else
        {
                return TRUE;
        }
} s32 scdata_section_len(name)
```

C 25

Professional Software Technologies, Inc. © Copyright 1995

```
u8 *name;
{
      register s32          section_len;
      u8     *ptr;

if ((ptr = find_section_header(name)) == NULL)
            return 0;

if ((ptr[0] == '%') && (ptr[1] == '%'))
            return 0;

section_len = 1;

while (find_next_line_in_section(&ptr))
            section_len++;

return section_len;
} s32 linelength(string)
u8 *string;
{
      register s32          len=0;

while( *string != NUL && *string != CR && *string != LF)
      {
            len++;
            string++;
      }
      return(len);
}

ABMSEX_TAB *best_abmsex(angle, ruling, res, yellow_ruling_ratio, abmsex_index)
double angle, ruling, res;
s32 yellow_ruling_ratio, *abmsex_index;
{
      register ABMSEX_TAB        *best_abmsex, *abmsex;
      ROSDEF_ANGLE     rosdef_angle;
      float            error, best_error, target_pixels_per_spot;

if (angle <= 7.5)
            rosdef_angle = degrees_0;
      else if (angle <= 30.0)
            rosdef_angle = degrees_15;
      else if (angle <= 60.0)
            rosdef_angle = degrees_45;
      else if (angle <= 82.5)
            rosdef_angle = degrees_75;
      else
            rosdef_angle = degrees_0;

*abmsex_index = (s32)rosdef_angle +
                                  ((rosdef_angle == degrees_0) ?
                                       yellow_ruling_ratio : 0);

if (ruling <= 1E-10 * res)
            target_pixels_per_spot = 1E10;
      else
            target_pixels_per_spot = res / ruling;
```

C 26

Professional Software Technologies, Inc. © Copyright 1995

```
        best_abmsex = abmsex_tab;
        best_error = fabs(best_abmsex->pixels_per_spot - target_pixels_per_spot);

abmsex = &abmsex_tab[1];
        while(abmsex->pixels_per_spot >= f_zero)
        {
                error = fabs(abmsex->pixels_per_spot - target_pixels_per_spot);
                if (error < best_error)
                {
                        best_abmsex = abmsex;
                        best_error = error;
                }
                abmsex++;
        } return(best_abmsex);
}

ABMSEX_TAB *best_abmsex_offset(angle, ruling, res, yellow_ruling_ratio,
abmsex_index)
float angle, ruling, res;
s32 yellow_ruling_ratio, *abmsex_index;
{
        register ABMSEX_TAB             *best_abmsex, *abmsex;
        ROSDEF_ANGLE      rosdef_angle;
        float             error, best_error, target_pixels_per_spot;

if (angle <= 15.0)
                rosdef_angle = degrees_0;
        else if (angle <= 37.5)
                rosdef_angle = degrees_15;
        else if (angle <= 67.5)
                rosdef_angle = degrees_45;
        else
                rosdef_angle = degrees_75;

*abmsex_index = (s32)rosdef_angle +
                                        ((rosdef_angle == degrees_0) ?
                                                yellow_ruling_ratio : 0);

if (ruling <= 1E-10 * res)
                target_pixels_per_spot = 1E10;
        else
                target_pixels_per_spot = res / ruling;

best_abmsex = abmsex_offset_tab;
        best_error = fabs(best_abmsex->pixels_per_spot - target_pixels_per_spot);

abmsex = &abmsex_offset_tab[1];
        while(abmsex->pixels_per_spot >= f_zero)
        {
                error = fabs(abmsex->pixels_per_spot - target_pixels_per_spot);
                if (error < best_error)
                {
                        best_abmsex = abmsex;
                        best_error = error;
                }
                abmsex++;
        }
```

C 27

Professional Software Technologies, Inc. © Copyright 1995
```
        return(best_abmsex);
} read_fm_tilesize()
{
        u8              *ptr;
        s32                     i, num;

num = scdata_section_len("fm_dot_names") / 2;

if (num == 0)
        {
                fma_tab = fmm_tab = NULL;
                return;
        } if (((fma_tab = (s32 *)get_mem(num*SIZEOF(*fma_tab),1L)) == NULL) ||
            ((fmm_tab = (s32 *)get_mem(num*SIZEOF(*fmm_tab),1L)) == NULL))
        {
                warning(GSTR(29,"Failed to allocate memory for fm data\n"));
                return;
        } ptr = find_section_header("fm_dot_names");

nfor(i, 0, num)
        {
                find_next_line_in_section(&ptr);
                if (sscanf(ptr, "%d:%d", fma_tab+i, fmm_tab+i) < 2)
                {
                        fma_tab[i] = 1;
                        fmm_tab[i] = 256;
                }
                find_next_line_in_section(&ptr);
        } return;
} read_abmsex_data()
{
        register ABMSEX_TAB     *abmsex;
        u8              *ptr;
        register s32            i, j, lines;
        s32                     p, q, n;

lines = scdata_section_len("abm_data");

if (lines == 0)
        {
                abmsex_tab = NULL;
                return;
        } if((abmsex_tab =
                    (ABMSEX_TAB *)get_mem((lines+1)*SIZEOF(ABMSEX_TAB),1L))==NULL)
        {
                warning(GSTR(30,"Failed to allocate memory for abm data"));
                return;
        }
```

Professional Software Technologies, Inc. © Copyright 1995

```
        ptr = find_section_header("abm_data");

i = 0;
        abmsex = abmsex_tab;

while (i < lines)
        {
                if(sscanf(ptr,
                        GSTR(32,"%d:%d:%d:%d:%d:%d:%d:%d:%d:%d:%d:%d:%d:%d:%d:%d:%d:%d"),
                        &(abmsex->a[degrees_45]),
                        &(abmsex->b[degrees_45]),
                        &(abmsex->m[degrees_45]),
                        &(abmsex->a[degrees_15]),
                        &(abmsex->b[degrees_15]),
                        &(abmsex->m[degrees_15]),
                        &(abmsex->a[degrees_75]),
                        &(abmsex->b[degrees_75]),
                        &(abmsex->m[degrees_75]),
                        &(abmsex->a[degrees_0]),
                        &(abmsex->b[degrees_0]),
                        &(abmsex->m[degrees_0]),
                        &(abmsex->a[degrees_0+1]),
                        &(abmsex->b[degrees_0+1]),
                        &(abmsex->m[degrees_0+1]),
                        &(abmsex->a[degrees_0+2]),
                        &(abmsex->b[degrees_0+2]),
                        &(abmsex->m[degrees_0+2])) == 18)
                {
                        abmsex->pixels_per_spot = 0.0;
                        nfor(j, 0, 3)
                        {
                                abmsex->pixels_per_spot +=
                                        (double)abmsex->m[j]/hypot((double)abmsex->a[j],
                                                                    (double)abmsex->b[j]);
                        }
                        abmsex->pixels_per_spot /= 3;

i++;
                        abmsex++;
                } find_next_line_in_section(&ptr);
        } abmsex->pixels_per_spot = -1.0;   /* end marker */ return;
} read_abmsex_offset_data()
{
        register ABMSEX_TAB     *abmsex;
        u8              *ptr;
        register s32            i, j, lines;

lines = scdata_section_len("abm_offset_data");

if (lines == 0)
        {
                abmsex_offset_tab = NULL;
                return;
```

C 29

Professional Software Technologies, Inc. © Copyright 1995
}

```
    if((abmsex_offset_tab =
                (ABMSEX_TAB *)get_mem((lines+1)*SIZEOF(ABMSEX_TAB),1L))==NULL)
    {
        warning(GSTR(34,"Failed to allocate memory for abm offset data"));
        return;
    } ptr = find_section_header("abm_offset_data");

i = 0;
    abmsex = abmsex_offset_tab;

while (i < lines)
    {
        if(sscanf(ptr,
            GSTR(36,"%d:%d:%d:%d:%d:%d:%d:%d:%d:%d:%d:%d:%d:%d:%d:%d:%d:%d"),
            &(abmsex->a[degrees_45]),
            &(abmsex->b[degrees_45]),
            &(abmsex->m[degrees_45]),
            &(abmsex->a[degrees_15]),
            &(abmsex->b[degrees_15]),
            &(abmsex->m[degrees_15]),
            &(amsex->a[degrees_75]),
            &(abmsex->b[degrees_75]),
            &(abmsex->m[degrees_75]),
            &(abmsex->a[degrees_0]),
            &(abmsex->b[degrees_0]),
            &(abmsex->m[degrees_0]),
            &(abmsex->a[degrees_0+1]),
            &(abmsex->b[degrees_0+1]),
            &(abmsex->m[degrees_0+1]),
            &(abmsex->a[degrees_0+2]),
            &(abmsex->b[degrees_0+2]),
            &(abmsex->m[degrees_0+2])) == 18)
        {
            abmsex->pixels_per_spot = 0.0;
            nfor(j, 0, 3)
            {
                abmsex->pixels_per_spot +=
                    (double)abmsex->m[j]/hypot((double)abmsex->a[j],
                                                                (double)abmsex->b[j]);
            }
            abmsex->pixels_per_spot /= 3;

i++;
            abmsex++;
        } find_next_line_in_section(&ptr);
    } abmsex->pixels_per_spot = -1.0;   /* end marker */ return;
} scrErr add_to_scdata(buffer)
u8 *buffer;
{
```

C 30

Professional Software Technologies, Inc. © Copyright 1995

```
        u8      *temp_ptr;

if(scdata_buffer==NULL)
        {
                scdata_buffer=(u8 *)malloc(strlen(buffer)+1);
                if(scdata_buffer==NULL)
                        return scrErr_NoMemory;
                strcpy(scdata_buffer,buffer);
        }
        else
        {
                scdata_buffer=(u8 *)realloc(scdata_buffer,
strlen(scdata_buffer)+strlen(buffer)+1 );
                if(scdata_buffer==NULL)
                        return scrErr_NoMemory;
                strcat(scdata_buffer,buffer);
        }
        return scrErr_OK;
} read_scdata(ripdir)
char *ripdir;
{
        u8          filename[256], buffer[128], *ptr;
        s32         bytes_read;
        FILE        *fp;
        scrErr      retval;

if(scdata_buffer!=NULL)
                return scrErr_OK;

sprintf(filename,"%s/scdata",ripdir);
        fp=fopen(filename,"r");
        if(!fp)
                return scrErr_NoScdata;

while(fgets(buffer,128,fp) != NULL)
                if((retval=add_to_scdata(buffer))!=scrErr_OK)
                {
                        fclose(fp);
                        return retval;
                }
        fclose(fp);
        read_abmsex_data();
        read_abmsex_offset_data();
        read_fm_tilesize();

return scrErr_OK;
} scrErr InitScreening(Control, DotTable, ripdir)
scrControl *Control;
scrDotTable *DotTable;
char *ripdir;
{
        Hidden      *hidden;
        u8          *ptr;
        s32         s_class;
```

C 31

Professional Software Technologies, Inc. © Copyright 1995

```
        scrErr    code;
        char    local_ripdir[128];

if (ripdir == NULL)
                strcpy(local_ripdir, "/usr/hyphen/rip");
        else
        {
                if (strlen(ripdir) > 127)
                        return scrErr_RipDirNameTooLong;
                else
                        strcpy(local_ripdir, ripdir);
        } if ((code = read_scdata(local_ripdir)) != scrErr_OK)
                return code;

DotTable->class_max = 3;

DotTable->num_in_class=
                (long *) malloc(sizeof(*(DotTable->num_in_class)) *    DotTable-
>class_max);
        if(DotTable->num_in_class==NULL)
                return scrErr_NoMemory;
        DotTable->dot_name=
                (char ***)malloc(sizeof(*(DotTable->dot_name)) * DotTable->class_max);
        if(DotTable->dot_name==NULL)
                return scrErr_NoMemory;

nfor(s_class,0,DotTable->class_max)
        {
                s32    i;
                static char *class_names[3]= {"rosette_definition_dot_names", "rosette_definition_offset_dot_names",
                                                    "fm_dot_names"};
#ifdef DEBUG
                if (screen_debug & SCREEN_DEBUG_INITSCREENING)
                {
                        fprintf(stderr, "SCREEN_DEBUG_INITSCREENING\n");
                        fprintf(stderr, "Dots in s_class %d\n", s_class);
                }
endif
                DotTable-
>num_in_class[s_class]=scdata_section_len(class_names[s_class]);
                if(s_class==FM_CLASS)
                        DotTable->num_in_class[s_class] /= 2;

if(DotTable->num_in_class[s_class] > 0)
                {
                        DotTable->dot_name[s_class]=
                                (char **)malloc(sizeof(*(DotTable->dot_name[s_class])) *

DotTable->num_in_class[s_class]);
                        if(DotTable->dot_name[s_class]==NULL)
                                return scrErr_NoMemory;
                }
```

C 32

Professional Software Technologies, Inc. © Copyright 1995

```
            else
                    DotTable->dot_name[s_class]=NULL;

nfor(i,0,DotTable->num_in_class[s_class])
            {
                    u8      *next_line;
                    s32     len;

if(i==0)
                            ptr=find_section_header(class_names[s_class]);
                    else
                    {
                            find_next_line_in_section(&ptr);
                            if(s_class==FM_CLASS)
                                    find_next_line_in_section(&ptr);
                    }
                    len=linelength(ptr);

DotTable->dot_name[s_class][i]=(char *) malloc(len+1);
                    if(DotTable->dot_name[s_class][i]==NULL)
                            return scrErr_NoMemory;

strncpy(DotTable->dot_name[s_class][i],ptr,len);
                    DotTable->dot_name[s_class][i][len]=NUL;
#ifdef DEBUG
                    if (screen_debug & SCREEN_DEBUG_INITSCREENING)
                            fprintf(stderr, "%s\n", DotTable->dot_name[s_class][i]);
#endif
            }

} hidden=(Hidden *) malloc(sizeof(*hidden));
    hidden->data=NULL;
    if(hidden==NULL)
            return scrErr_NoMemory;

hidden->my_DotTable=*DotTable;
    hidden->yellow_ruling_ratio=YRR_LOW;
    hidden->dot_centred=NO;
    hidden->fm_scale=1;
    hidden->flip=FALSE;
    strcpy(hidden->ripdir, local_ripdir);
    Control->forHyphenUse = (void *) hidden;

return scrErr_OK;
} scrErr SetHyphenAMRosetteCentre(Control, RosetteCentre)
scrControl *Control;
scrRosetteCentre RosetteCentre;
{
    Hidden *hidden = Control->forHyphenUse;

if (RosetteCentre == scrRosetteCentre_Clear)
            hidden->dot_centred = NO;
    else if (RosetteCentre == scrRosetteCentre_Dot)
            hidden->dot_centred = YES;
    else
            return scrErr_BadRosetteCentre;
```

C 33

Professional Software Technologies, Inc. © Copyright 1995

```
        return scrErr_OK;
} scrErr SetHyphenAMYellowRulingRatio(Control, YellowRulingRatio)
scrControl *Control;
scrYellowRulingRatio YellowRulingRatio;
{
        Hidden *hidden = Control->forHyphenUse;

if (YellowRulingRatio == scrYRR_High)
                hidden->yellow_ruling_ratio = YRR_HIGH;
        else if (YellowRulingRatio == scrYRR_Medium)
                hidden->yellow_ruling_ratio = YRR_MED;
        else if (YellowRulingRatio == scrYRR_Low)
                hidden->yellow_ruling_ratio = YRR_LOW;
        else
                return scrErr_BadYellowRulingRatio;

return scrErr_OK;
} scrErr SetHyphenFMScale(Control, scale)
scrControl *Control;
long scale;
{
        Hidden *hidden = Control->forHyphenUse;

if (scale > 0)
                hidden->fm_scale = scale;
        else
                return scrErr_BadFMScale;

return scrErr_OK;
} scrErr SetHyphenFlip(Control, flip)
scrControl *Control;
long flip;
{
        Hidden *hidden = Control->forHyphenUse;
        hidden->flip = flip;
        return scrErr_OK;
} scrErr SetScreen(Control)
scrControl *Control;
{
        register u8  *cmt;
        static u8    comment1[] = "Rosette Definition\n";
        static u8    comment2[] = "Rosette Definition Offset\n";
        static u8    comment3[] = "FM\n";
        u8           *comment_sought;
        BOOL         comment_ok;
        u8           comment_block[102400], *ptr, first;
        s32          bytes_read;

ABMSEX_TAB   *abm;
        s32          abm_index;
        Hidden       *hidden = (Hidden *)(Control->forHyphenUse);
        double       ang =    Control->angle;
```

C 34

Professional Software Technologies, Inc. © Copyright 1995

```
        double          freq =      Control->frequency;
        double          res =       Control->resolution;
        scrDot          dot;
        s32             a,b,m,dot_index;
        u8              filename[256];
        FILE            *fp;
        BRICK           brick, tint;
        u8              *temp_brick;

dot =           Control->dotShape;

#ifdef DEBUG
        if (screen_debug & SCREEN_DEBUG_SETSCREEN_REQUEST)
        {
                fprintf(stderr, "SCREEN_DEBUG_SETSCREEN_REQUEST\n");
                fprintf(stderr, "res:%.1f  freq:%.1f  angle:%.1f\n", res, freq, ang);
                fprintf(stderr, "Class:%d  number:%d\n", dot.s_class, dot.num);
                if (hidden->dot_centred)
                        fprintf(stderr, "Dot centred\n");
                else
                        fprintf(stderr, "Clear centred\n");
                if (hidden->yellow_ruling_ratio == YRR_HIGH)
                        fprintf(stderr, "Yellow ruling ratio : high\n");
                else if (hidden->yellow_ruling_ratio == YRR_MED)
                        fprintf(stderr, "Yellow ruling ratio : medium\n");
                else if (hidden->yellow_ruling_ratio == YRR_LOW)
                        fprintf(stderr, "Yellow ruling ratio : low\n");
                else
                        fprintf(stderr, "Yellow ruling ratio : unknown\n");
        }
endif while (ang < 0.0)
                ang += 90.0;

while (ang >= 90.0)
                ang -= 90.0;

if(freq <= 0.0 || res <= 0.0 || res/freq < 1.0)
                return scrErr_BadSetscreen;

if(dot.s_class >= hidden->my_DotTable.class_max ||
                dot.num >= hidden->my_DotTable.num_in_class[dot.s_class])
        {
                return scrErr_BadSetscreen;
        } switch(dot.s_class)
        {
                case RD_CLASS:
                        abm=best_abmsex(ang, freq, res, hidden->yellow_ruling_ratio,
&abm_index);
                        a=abm->a[abm_index];
                        b=abm->b[abm_index];
                        m=abm->m[abm_index];
                        dot_index=(dot.num *2) + 4 +
                                        ((hidden->dot_centred && (abm_index ==
degrees_45)) ? 1 : 0);
                        comment_sought=comment1;
                break;
```

C 35

Professional Software Technologies, Inc. © Copyright 1995

```
            case RDO_CLASS:
                    abm=best_abmsex_offset(ang, freq, res, hidden-
>yellow_ruling_ratio, &abm_index);
                    a=abm->a[abm_index];
                    b=abm->b[abm_index];
                    m=abm->m[abm_index];
                    dot_index=(dot.num *2) + 4 +
                                        ((hidden->dot_centred && (abm_index ==
degrees_45)) ? 1 : 0);
                    comment_sought=comment2;
                    break;
            case FM_CLASS:
                    a=fma_tab[dot.num];
                    b=0;
                    m=fmm_tab[dot.num];

dot_index=dot.num * 4;
                    if(ang < 7.5)
                            dot_index+=3;
                    else if(ang < 30.0)
                            dot_index+=1;
                    else if(ang < 60.0)
                            dot_index+=0;
                    else if(ang < 82.5)
                            dot_index+=2;
                    else
                            dot_index+=3;

dot_index = MAX_DOT_NUMBER - dot_index;
                    comment_sought=comment3;
                    break;
            default:
                    return scrErr_BadSetscreen;
    } make_dotdir_name(a,b,m,dot_index,filename,hidden->ripdir);
    strcat(filename,"/screen.fil");

#ifdef DEBUG
    if (screen_debug & SCREEN_DEBUG_SETSCREEN_FILE)
    {
            fprintf(stderr, "SCREEN_DEBUG_SETSCREEN_FILE\n");
            fprintf(stderr, "d:%d a:%d b:%d m:%d\n", dot_index, a, b, m);
            fprintf(stderr, "File %s\n", filename);
    }
endif fp=fopen(filename,"r");
    if(fp==NULL)
            return scrErr_BadDotData;
    if(fread(&brick,sizeof(brick),1,fp) == 0)
    {
            fclose(fp);
            return scrErr_BadDotData;
    }
    if(brick.a != a || brick.b!=b || brick.m!=m)
    {
            fclose(fp);
            return scrErr_BadDotData;
    } if(fread(&tint,sizeof(tint),1,fp) == 0)
```

C 36

Professional Software Technologies, Inc. © Copyright 1995

```
        {
                fclose(fp);
                return scrErr_BadDotData;
        } temp_brick=(u8 *)malloc(brick.area * (dot.s_class==FM_CLASS ? hidden-
>fm_scale*hidden->fm_scale : 1));
        if(temp_brick==NULL)
        {
                fclose(fp);
                return scrErr_NoMemory;
        } if(fread(temp_brick,1,brick.area,fp) == 0)
        {
                free(temp_brick);
                fclose(fp);
                return scrErr_BadDotData;
        } encrypt(temp_brick, brick.area, dot_index);

for(ptr=comment_block ; (bytes_read=fread(ptr,1,80,fp)) > 0 ; ptr+=bytes_read)
                ;

*ptr=NUL;

fclose(fp);
        comment_ok=NO;
        first = *comment_sought;
        for(cmt = comment_block ; *cmt != NUL ; cmt++)
        {
                if(*cmt == first &&
                        strncmp(cmt,comment_sought, strlen(comment_sought)) == 0)
                {
                        comment_ok = TRUE;
                        break;
                }
        }
        if(!comment_ok)
                return scrErr_BadDotData;

/* do FM scaling */ if ((dot.s_class == FM_CLASS) && (hidden->fm_scale != 1))
        {
                s32 scale = hidden->fm_scale;
                s32 i, j;

for(j=brick.depth-1; j>=0; j--)
                {
                        for(i=brick.width-1; i>=0; i--)
                        {
                                u8 val = temp_brick[j*brick.width+i];
                                s32 i1, j1;

for(j1=scale-1; j1>=0; j1--)
                                {
```

C 37

Professional Software Technologies, Inc. © Copyright 1995

```
                            for(i1=scale-1; i1>=0; i1--)
                            {
    temp_brick[(j*scale+j1)*(brick.width*scale)+(i*scale+i1)] = val;
                            }
                    }
            }
    } brick.a *= scale;
            brick.b *= scale;
            brick.m *= scale;
            brick.depth *= scale;
            brick.width *= scale;
            brick.stagger *= scale;
            brick.area *= scale*scale;
    }

/*  do flip  */ if (hidden->flip)
    {
            s32 j;

nfor(j, 0, brick.depth)
            {
                    u8 *p1, *p2;
                    s32 i;

p1 = temp_brick+(j*brick.width);
                    p2 = temp_brick+(j*brick.width+(brick.width-1));

loop(i, brick.width/2)
                    {
                            u8 val;

val = *p1;
                            *p1++ = *p2;
                            *p2-- = val;
                    }
            } if (brick.stagger != 0)
                    brick.stagger = brick.width - brick.stagger;
    } hidden->brick=brick;
    if(hidden->data != NULL)
    {
            free(hidden->data);
            hidden->data=NULL;
    }
    hidden->data=temp_brick;

#ifdef DEBUG
    if (screen_debug & SCREEN_DEBUG_SETSCREEN_DATA)
    {
            int i, j, sum;

fprintf(stderr, "SCREEN_DEBUG_SETSCREEN_DATA\n");

sum = 0;
```

C 38

Professional Software Technologies, Inc. © Copyright 1995

```
            nfor(i, 0, brick.area)
            {
                    sum += hidden->data[i];
                    sum %= 100000;
            } fprintf(stderr, "Checksum %d\n", sum);

fprintf(stderr, "Data at %X\n", hidden->data);

nfor(j, 0, 16)
            {
                    nfor(i, 0, 16)
                            fprintf(stderr, "%02X ", hidden->data[j*16+i]);
                    fprintf(stderr, "\n");
            }
        }
endif return scrErr_OK;

} scrErr ScreenBlock(Control)
scrControl *Control;
{
        register unsigned char *s, *d, *p;
        register long x, y, i, j, k, x1, words_per_line;
        register unsigned long mask, out;
#ifdef DEBUG
        register unsigned char dmax, dmin;
#endif
        Hidden *stat = (Hidden *)(Control->forHyphenUse);

#ifdef DEBUG
        if (screen_debug & SCREEN_DEBUG_SCREENBLOCK_THRESHOLD_DATA)
        {
                register int i, j, sum;

fprintf(stderr, "SCREEN_DEBUG_SCREENBLOCK_THRESHOLD_DATA\n");

sum = 0;
                nfor(i, 0, stat->brick.area)
                {
                        sum += stat->data[i];
                        sum %= 100000;
                } fprintf(stderr, "Checksum %d\n", sum);

fprintf(stderr, "Threshold data at %X\n", stat->data);
                nfor(j, 0, 16)
                {
                        nfor(i, 0, 16)
                                fprintf(stderr, "%02X ", stat->data[j*16+i]);
                        fprintf(stderr, "\n");
                }
        }
```

C 39

Professional Software Technologies, Inc. © Copyright 1995

```
        if (screen_debug & SCREEN_DEBUG_SCREENBLOCK_CONTONE_DATA)
        {
                register int i, j;

fprintf(stderr, "SCREEN_DEBUG_SCREENBLOCK_CONTONE_DATA\n");
                fprintf(stderr, "Contone data at %X\n", Control->dataPtr);
                nfor(j, 0, 16)
                {
                        nfor(i, 0, 16)
                                fprintf(stderr, "%02X ", Control->dataPtr[j*16+i]);
                        fprintf(stderr, "\n");
                }
        }
endif if ((Control->location->top > Control->location->bottom) ||
            (Control->location->left > Control->location->right) ||
            ((Control->location->right-Control->location->left+1) & 32 != 0))
                return scrErr_BadRect;

y = Control->location->top % stat->brick.depth;
        if (y < 0)
                y += stat->brick.depth;

x = Control->location->left -
                        ((Control->location->top / stat->brick.depth) * stat-
>brick.stagger);
        x %= stat->brick.width;
        if (x < 0)
                x += stat->brick.width;

s = stat->data + (y * stat->brick.width + x);

x1 = stat->brick.width - x;

words_per_line = (Control->location->right-Control->location->left+1) / 32;

d = p = Control->dataPtr;

#ifdef DEBUG
        dmin = 255;
        dmax = 0;
        if (screen_debug & SCREEN_DEBUG_SCREENBLOCK_OUTPUT_DATA)
                fprintf(stderr, "SCREEN_DEBUG_SCREENBLOCK_OUTPUT_DATA\n");
endif if (Control->positive)
        {
                for (j = Control->location->bottom-Control->location->top+1;
                     j != 0;
                     j--)
                {
                        /* wah - optimization */
                        register const unsigned long my_mask = 1 << 31;

for (i = words_per_line; i != 0; i--)
                        {
                                mask = my_mask;
                                out = 0;

for (k = 32; k != 0; k--)
```

C 40

Professional Software Technologies, Inc. © Copyright 1995

```
                        {
#ifdef DEBUG
                            if (*d < dmin)
                                dmin = *d;
                            if (*d > dmax)
                                dmax = *d;
#endif
                            if (*d++ >= *s++)
                            {
#ifdef DEBUG
                            if ((screen_debug & SCREEN_DEBUG_SCREENBLOCK_OUTPUT_DATA) &&
                                (j <= 32) &&
                                (i == 1))
                                            fprintf(stderr, "1");
#endif
                                out |= mask;
                            }
#ifdef DEBUG
                            else
                            {
                            if ((screen_debug & SCREEN_DEBUG_SCREENBLOCK_OUTPUT_DATA) &&
                                (j <= 32) &&
                                (i == 1))
                                            fprintf(stderr, "0");
                            }
endif mask >>= 1;

if (--x1 == 0)
                            {
                                x1 = stat->brick.width;
                                s -= stat->brick.width;
                            }
                        }
#ifdef DEBUG
                        if ((screen_debug & SCREEN_DEBUG_SCREENBLOCK_OUTPUT_DATA) &&
                            (j <= 32) &&
                            (i == 1))
                                        fprintf(stderr, "\n");
#endif
                        *p++ = out >> 24;
                        *p++ = (out >> 16) & 0xFF;
                        *p++ = (out >> 8) & 0xFF;
                        *p++ = out & 0xFF;
                    } if (++y == stat->brick.depth)
                    {
                        y = 0;
                        x -= stat->brick.stagger;
                        if (x < 0)
                            x += stat->brick.width;
                    } s = stat->data + (y * stat->brick.width + x);

x1 = stat->brick.width - x;
                }
            }
            else
```

Professional Software Technologies, Inc. © Copyright 1995

```
        {
                for (j = Control->location->bottom-Control->location->top+1;
                    j != 0;
                    j--)
                {
                    for (i = words_per_line; i != 0; i--)
                    {
                        mask = 1 << 31;
                        out = 0;

for (k = 32; k != 0; k--)
                        {
#ifdef DEBUG
                            if (*d < dmin)
                                dmin = *d;
                            if (*d > dmax)
                                dmax = *d;
#endif
                            if (*d++ < *s++)
                            {
#ifdef DEBUG
                                if ((screen_debug &
SCREEN_DEBUG_SCREENBLOCK_OUTPUT_DATA) &&
                                    (j <= 32) &&
                                    (i == 1))
                                            fprintf(stderr, "1");
#endif
                                out |= mask;
                            }
#ifdef DEBUG
                            else
                            {
                                if ((screen_debug &
SCREEN_DEBUG_SCREENBLOCK_OUTPUT_DATA) &&
                                    (j <= 32) &&
                                    (i == 1))
                                            fprintf(stderr, "0");
                            }
endif
                            mask >>= 1;
                            if (--x1 == 0)
                            {
                                x1 = stat->brick.width;
                                s -= stat->brick.width;
                            }
                        }
#ifdef DEBUG
                        if ((screen_debug & SCREEN_DEBUG_SCREENBLOCK_OUTPUT_DATA) &&
                            (j <= 32) &&
                            (i == 1))
                                    fprintf(stderr, "\n");
#endif
                        *p++ = out >> 24;
                        *p++ = (out >> 16) & 0xFF;
                        *p++ = (out >> 8) & 0xFF;
                        *p++ = out & 0xFF;
                    } if (++y == stat->brick.depth)
```

C 42

Professional Software Technologies, Inc. © Copyright 1995

```
                {
                        y = 0;
                        x -= stat->brick.stagger;
                        if (x < 0)
                                x += stat->brick.width;
                } s = stat->data + (y * stat->brick.width + x);

x1 = stat->brick.width - x;
        }
     }
#ifdef DEBUG
        if (screen_debug & SCREEN_DEBUG_SCREENBLOCK_CONTONE_DATA)
        {
                fprintf(stderr, "SCREEN_DEBUG_SCREENBLOCK_CONTONE_DATA\n");
                fprintf(stderr, "Min %02X max %02X\n", dmin, dmax);
        }
endif words_per_line << 2;

return scrErr_OK;
} scrErr EndScreening(Control, DotTable)
scrControl *Control;
scrDotTable *DotTable;
{
        register s32            s_class, num;
        Hidden          *hidden = (Hidden *)(Control->forHyphenUse);

if(hidden!=NULL)
        {
                if(hidden->data!=NULL)
                {
                        free(hidden->data);
                        hidden->data=NULL;
                }
                free(hidden);
                hidden=NULL;
        } nfor(s_class,0,DotTable->class_max)
        {
                nfor(num,0,DotTable->num_in_class[s_class])
                {
                        if(DotTable->dot_name[s_class][num]!=NULL)
                        {
                                free(DotTable->dot_name[s_class][num]);
                                DotTable->dot_name[s_class][num]=NULL;
                        }
                }
                if(DotTable->dot_name[s_class]!=NULL)
                {
                        free(DotTable->dot_name[s_class]);
```

C 43

Professional Software Technologies, Inc. © Copyright 1995

```
    u8              filename[256];
    FILE            *fp;
    BRICK           brick, tint;
    u8              *temp_brick;

dot =           Control->dotShape;
#ifdef DEBUG
    if (screen_debug & SCREEN_DEBUG_SETSCREEN_REQUEST)
    {
        fprintf(stderr, "SCREEN_DEBUG_SETSCREEN_REQUEST\n");
        fprintf(stderr, "res:%.1f  freq:%.1f  angle:%.1f\n", res, freq, ang);
        fprintf(stderr, "Class:%d  number:%d\n", dot.s_class, dot.num);
        if (hidden->dot_centred)
            fprintf(stderr, "Dot centred\n");
        else
            fprintf(stderr, "Clear centred\n");
        if (hidden->yellow_ruling_ratio == YRR_HIGH)
            fprintf(stderr, "Yellow ruling ratio : high\n");
        else if (hidden->yellow_ruling_ratio == YRR_MED)
            fprintf(stderr, "Yellow ruling ratio : medium\n");
        else if (hidden->yellow_ruling_ratio == YRR_LOW)
            fprintf(stderr, "Yellow ruling ratio : low\n");
        else
            fprintf(stderr, "Yellow ruling ratio : unknown\n");
    }
endif while (ang < 0.0)
        ang += 90.0;

while (ang >= 90.0)
        ang -= 90.0;

if(freq <= 0.0 || res <= 0.0 || res/freq < 1.0)
        return scrErr_BadSetscreen;

if(dot.s_class >= hidden->my_DotTable.class_max ||
       dot.num >= hidden->my_DotTable.num_in_class[dot.s_class])
    {
        return scrErr_BadSetscreen;
    } switch(dot.s_class)
    {
        case RD_CLASS:
            abm=best_abmsex(ang, freq, res, hidden->yellow_ruling_ratio,
&abm_index);
            a=abm->a[abm_index];
            b=abm->b[abm_index];
            m=abm->m[abm_index];
            dot_index=(dot.num *2) + 4 +
                            ((hidden->dot_centred && (abm_index ==
degrees_45)) ? 1 : 0);
            comment_sought=comment1;
        break;
        case RDO_CLASS:
            abm=best_abmsex_offset(ang, freq, res, hidden-
>yellow_ruling_ratio, &abm_index);
            a=abm->a[abm_index];
```

C 44

Professional Software Technologies, Inc. © Copyright 1995

```c
scrErr SetHyphenAMYellowRulingRatio(Control, YellowRulingRatio)
scrControl *Control;
scrYellowRulingRatio YellowRulingRatio;
{
        Hidden *hidden = Control->forHyphenUse;

if (YellowRulingRatio == scrYRR_High)
                hidden->yellow_ruling_ratio = YRR_HIGH;
        else if (YellowRulingRatio == scrYRR_Medium)
                hidden->yellow_ruling_ratio = YRR_MED;
        else if (YellowRulingRatio == scrYRR_Low)
                hidden->yellow_ruling_ratio = YRR_LOW;
        else
                return scrErr_BadYellowRulingRatio;

return scrErr_OK;
} scrErr SetHyphenFMScale(Control, scale)
scrControl *Control;
long scale;
{
        Hidden *hidden = Control->forHyphenUse;

if (scale > 0)
                hidden->fm_scale = scale;
        else
                return scrErr_BadFMScale;

return scrErr_OK;
} scrErr SetHyphenFlip(Control, flip)
scrControl *Control;
long flip;
{
        Hidden *hidden = Control->forHyphenUse;
        hidden->flip = flip;
        return scrErr_OK;
} scrErr SetScreen(Control)
scrControl *Control;
{
        register u8  *cmt;
        static u8    comment1[] = "Rosette Definition\n";
        static u8    comment2[] = "Rosette Definition Offset\n";
        static u8    comment3[] = "FM\n";
        u8           *comment_sought;
        BOOL         comment_ok;
        u8           comment_block[102400], *ptr, first;
        s32          bytes_read;

ABMSEX_TAB   *abm;
        s32          abm_index;
        Hidden       *hidden = (Hidden *)(Control->forHyphenUse);
        double       ang  =   Control->angle;
        double       freq =   Control->frequency;
        double       res  =   Control->resolution;
        scrDot       dot;
        s32          a,b,m,dot_index;
```

C 45

Professional Software Technologies, Inc. © Copyright 1995

```
            nfor(i,0,DotTable->num_in_class[s_class])
            {
                    u8      *next_line;
                    s32     len;

if(i==0)
                            ptr=find_section_header(class_names[s_class]);
                    else
                    {
                            find_next_line_in_section(&ptr);
                            if(s_class==FM_CLASS)
                                    find_next_line_in_section(&ptr);
                    }
                    len=linelength(ptr);

DotTable->dot_name[s_class][i]=(char *) malloc(len+1);
                    if(DotTable->dot_name[s_class][i]==NULL)
                            return scrErr_NoMemory;

strncpy(DotTable->dot_name[s_class][i],ptr,len);
                    DotTable->dot_name[s_class][i][len]=NUL;
#ifdef DEBUG
                    if (screen_debug & SCREEN_DEBUG_INITSCREENING)
                            fprintf(stderr, "%s\n", DotTable->dot_name[s_class][i]);
#endif
            }

} hidden=(Hidden *) malloc(sizeof(*hidden));
    hidden->data=NULL;
    if(hidden==NULL)
            return scrErr_NoMemory;

hidden->my_DotTable=*DotTable;
    hidden->yellow_ruling_ratio=YRR_LOW;
    hidden->dot_centred=NO;
    hidden->fm_scale=1;
    hidden->flip=FALSE;
    strcpy(hidden->ripdir, local_ripdir);
    Control->forHyphenUse = (void *) hidden;

return scrErr_OK;
} scrErr SetHyphenAMRosetteCentre(Control, RosetteCentre)
scrControl *Control;
scrRosetteCentre RosetteCentre;
{
    Hidden *hidden = Control->forHyphenUse;

if (RosetteCentre == scrRosetteCentre_Clear)
            hidden->dot_centred = NO;
    else if (RosetteCentre == scrRosetteCentre_Dot)
            hidden->dot_centred = YES;
    else
            return scrErr_BadRosetteCentre;

return scrErr_OK;
}
```

C 46

Professional Software Technologies, Inc. © Copyright 1995

```
            strcpy(local_ripdir, "/usr/hyphen/rip");
        else
        {
            if (strlen(ripdir) > 127)
                return scrErr_RipDirNameTooLong;
            else
                strcpy(local_ripdir, ripdir);
        } if ((code = read_scdata(local_ripdir)) != scrErr_OK)
            return code;

DotTable->class_max = 3;

DotTable->num_in_class=
            (long *) malloc(sizeof(*(DotTable->num_in_class)) *   DotTable-
>class_max);
        if(DotTable->num_in_class==NULL)
            return scrErr_NoMemory;
        DotTable->dot_name=
            (char ***)malloc(sizeof(*(DotTable->dot_name)) * DotTable->class_max);
        if(DotTable->dot_name==NULL)
            return scrErr_NoMemory;

nfor(s_class,0,DotTable->class_max)
        {
            s32    i;
            static char *class_names[3]= {"rosette_definition_dot_names", "rosette_definition_offset_dot_names",
                                                            "fm_dot_names"};
#ifdef DEBUG
            if (screen_debug & SCREEN_DEBUG_INITSCREENING)
            {
                fprintf(stderr, "SCREEN_DEBUG_INITSCREENING\n");
                fprintf(stderr, "Dots in s_class %d\n", s_class);
            }
endif DotTable-
>num_in_class[s_class]=scdata_section_len(class_names[s_class]);
            if(s_class==FM_CLASS)
                DotTable->num_in_class[s_class] /= 2;

if(DotTable->num_in_class[s_class] > 0)
            {
                DotTable->dot_name[s_class]=
                    (char **)malloc(sizeof(*(DotTable->dot_name[s_class])) *

DotTable->num_in_class[s_class]);
                if(DotTable->dot_name[s_class]==NULL)
                    return scrErr_NoMemory;
            }
            else
                DotTable->dot_name[s_class]=NULL;
```

Professional Software Technologies, Inc. © Copyright 1995

```
            scdata_buffer=(u8 *)malloc(strlen(buffer)+1);
            if(scdata_buffer==NULL)
                    return scrErr_NoMemory;
            strcpy(scdata_buffer,buffer);
    }
    else
    {
            scdata_buffer=(u8 *)realloc(scdata_buffer,
strlen(scdata_buffer)+strlen(buffer)+1 );
            if(scdata_buffer==NULL)
                    return scrErr_NoMemory;
            strcat(scdata_buffer,buffer);
    }
    return scrErr_OK;
} read_scdata(ripdir)
char *ripdir;
{
    u8          filename[256], buffer[128], *ptr;
    s32         bytes_read;
    FILE  *fp;
    scrErr      retval;

if(scdata_buffer!=NULL)
            return scrErr_OK;

sprintf(filename,"%s/scdata",ripdir);
    fp=fopen(filename,"r");
    if(!fp)
            return scrErr_NoScdata;

while(fgets(buffer,128,fp) != NULL)
            if((retval=add_to_scdata(buffer))!=scrErr_OK)
            {
                    fclose(fp);
                    return retval;
            }
    fclose(fp);
    read_abmsex_data();
    read_abmsex_offset_data();
    read_fm_tilesize();

return scrErr_OK;
} scrErr InitScreening(Control, DotTable, ripdir)
scrControl *Control;
scrDotTable *DotTable;
char *ripdir;
{
    Hidden      *hidden;
    u8          *ptr;
    s32         s_class;
    scrErr      code;
    char   local_ripdir[128];

if (ripdir == NULL)
```

C 48

Professional Software Technologies, Inc. © Copyright 1995

```
        {
                warning(GSTR(34,"Failed to allocate memory for abm offset data"));
                return;
        } ptr = find_section_header("abm_offset_data");

i = 0;
        abmsex = abmsex_offset_tab;

while (i < lines)
        {
                if(sscanf(ptr,
                        GSTR(36,"%d:%d:%d:%d:%d:%d:%d:%d:%d:%d:%d:%d:%d:%d:%d:%d:%d:%d"),
                        &(abmsex->a[degrees_45]),
                        &(abmsex->b[degrees_45]),
                        &(abmsex->m[degrees_45]),
                        &(abmsex->a[degrees_15]),
                        &(abmsex->b[degrees_15]),
                        &(abmsex->m[degrees_15]),
                        &(abmsex->a[degrees_75]),
                        &(abmsex->b[degrees_75]),
                        &(abmsex->m[degrees_75]),
                        &(abmsex->a[degrees_0]),
                        &(abmsex->b[degrees_0]),
                        &(abmsex->m[degrees_0]),
                        &(abmsex->a[degrees_0+1]),
                        &(abmsex->b[degrees_0+1]),
                        &(abmsex->m[degrees_0+1]),
                        &(abmsex->a[degrees_0+2]),
                        &(abmsex->b[degrees_0+2]),
                        &(abmsex->m[degrees_0+2])) == 18)
                {
                        abmsex->pixels_per_spot = 0.0;
                        nfor(j, 0, 3)
                        {
                                abmsex->pixels_per_spot +=
                                        (double)abmsex->m[j]/hypot((double)abmsex->a[j],
                                                                   (double)abmsex->b[j]);
                        }
                        abmsex->pixels_per_spot /= 3;

i++;
                        abmsex++;
                } find_next_line_in_section(&ptr);
        } abmsex->pixels_per_spot = -1.0;

return;
} scrErr add_to_scdata(buffer)
u8 *buffer;
{
        u8      *temp_ptr;

if(scdata_buffer==NULL)
        {
```

Professional Software Technologies, Inc. © Copyright 1995

```
	while (i < lines)
	{
		if(sscanf(ptr,
			GSTR(32,"%d:%d:%d:%d:%d:%d:%d:%d:%d:%d:%d:%d:%d:%d:%d:%d:%d:%d"),
			&(abmsex->a[degrees_45]),
			&(abmsex->b[degrees_45]),
			&(abmsex->m[degrees_45]),
			&(abmsex->a[degrees_15]),
			&(abmsex->b[degrees_15]),
			&(abmsex->m[degrees_15]),
			&(abmsex->a[degrees_75]),
			&(abmsex->b[degrees_75]),
			&(abmsex->m[degrees_75]),
			&(abmsex->a[degrees_0]),
			&(abmsex->b[degrees_0]),
			&(abmsex->m[degrees_0]),
			&(abmsex->a[degrees_0+1]),
			&(abmsex->b[degrees_0+1]),
			&(abmsex->m[degrees_0+1]),
			&(abmsex->a[degrees_0+2]),
			&(abmsex->b[degrees_0+2]),
			&(abmsex->m[degrees_0+2])) == 18)
		{
			abmsex->pixels_per_spot = 0.0;
			nfor(j, 0, 3)
			{
				abmsex->pixels_per_spot +=
					(double)abmsex->m[j]/hypot((double)abmsex->a[j], (double)abmsex->b[j]);
			}
			abmsex->pixels_per_spot /= 3;

i++;
			abmsex++;
		} find_next_line_in_section(&ptr);
	} abmsex->pixels_per_spot = -1.0;

return;
} read_abmsex_offset_data()
{
	register ABMSEX_TAB	*abmsex;
	u8			*ptr;
	register s32		i, j, lines;

lines = scdata_section_len("abm_offset_data");

if (lines == 0)
	{
		abmsex_offset_tab = NULL;
		return;
	} if((abmsex_offset_tab =
		(ABMSEX_TAB *)get_mem((lines+1)*SIZEOF(ABMSEX_TAB),1L))==NULL)
```

Professional Software Technologies, Inc. © Copyright 1995

```
read_fm_tilesize()
{
        u8              *ptr;
        s32                     i, num;

num = scdata_section_len("fm_dot_names") / 2;

if (num == 0)
        {
                fma_tab = fmm_tab = NULL;
                return;
        } if (((fma_tab = (s32 *)get_mem(num*SIZEOF(*fma_tab),1L)) == NULL) ||
            ((fmm_tab = (s32 *)get_mem(num*SIZEOF(*fmm_tab),1L)) == NULL))
        {
                warning(GSTR(29,"Failed to allocate memory for fm data\n"));
                return;
        } ptr = find_section_header("fm_dot_names");

nfor(i, 0, num)
        {
                find_next_line_in_section(&ptr);
                if (sscanf(ptr, "%d:%d", fma_tab+i, fmm_tab+i) < 2)
                {
                        fma_tab[i] = 1;
                        fmm_tab[i] = 256;
                }
                find_next_line_in_section(&ptr);
        } return;
} read_abmsex_data()
{
        register ABMSEX_TAB     *abmsex;
        u8              *ptr;
        register s32            i, j, lines;
        s32                     p, q, n;

lines = scdata_section_len("abm_data");

if (lines == 0)
        {
                abmsex_tab = NULL;
                return;
        } if((abmsex_tab =
                    (ABMSEX_TAB *)get_mem((lines+1)*SIZEOF(ABMSEX_TAB),1L))==NULL)
        {
                warning(GSTR(30,"Failed to allocate memory for abm data"));
                return;
        } ptr = find_section_header("abm_data");

i = 0;
        abmsex = abmsex_tab;
```

Professional Software Technologies, Inc. © Copyright 1995

```
        abmsex = &abmsex_tab[1];
        while(abmsex->pixels_per_spot >= f_zero)
        {
                error = fabs(abmsex->pixels_per_spot - target_pixels_per_spot);
                if (error < best_error)
                {
                        best_abmsex = abmsex;
                        best_error = error;
                }
                abmsex++;
        } return(best_abmsex);
}

ABMSEX_TAB *best_abmsex_offset(angle, ruling, res, yellow_ruling_ratio,
abmsex_index)
float angle, ruling, res;
s32 yellow_ruling_ratio, *abmsex_index;
{
        register ABMSEX_TAB        *best_abmsex, *abmsex;
        ROSDEF_ANGLE     rosdef_angle;
        float            error, best_error, target_pixels_per_spot;

if (angle <= 15.0)
                rosdef_angle = degrees_0;
        else if (angle <= 37.5)
                rosdef_angle = degrees_15;
        else if (angle <= 67.5)
                rosdef_angle = degrees_45;
        else
                rosdef_angle = degrees_75;

*abmsex_index = (s32)rosdef_angle +
                                        ((rosdef_angle == degrees_0) ?
                                                yellow_ruling_ratio : 0);

if (ruling <= 1E-10 * res)
                target_pixels_per_spot = 1E10;
        else
                target_pixels_per_spot = res / ruling;

best_abmsex = abmsex_offset_tab;
        best_error = fabs(best_abmsex->pixels_per_spot - target_pixels_per_spot);

abmsex = &abmsex_offset_tab[1];
        while(abmsex->pixels_per_spot >= f_zero)
        {
                error = fabs(abmsex->pixels_per_spot - target_pixels_per_spot);
                if (error < best_error)
                {
                        best_abmsex = abmsex;
                        best_error = error;
                }
                abmsex++;
        } return(best_abmsex);
}
```

Professional Software Technologies, Inc. © Copyright 1995

```
        if ((ptr = find_section_header(name)) == NULL)
                return 0;

if ((ptr[0] == '%') && (ptr[1] == '%'))
                return 0;

section_len = 1;

while (find_next_line_in_section(&ptr))
                section_len++;

return section_len;
} s32 linelength(string)
u8 *string;
{
        register s32            len=0;

while( *string != NUL && *string != CR && *string != LF)
        {
                len++;
                string++;
        }
        return(len);
}

ABMSEX_TAB *best_abmsex(angle, ruling, res, yellow_ruling_ratio, abmsex_index)
double angle, ruling, res;
s32 yellow_ruling_ratio, *abmsex_index;
{
        register ABMSEX_TAB             *best_abmsex, *abmsex;
        ROSDEF_ANGLE    rosdef_angle;
        float           error, best_error, target_pixels_per_spot;

if (angle <= 7.5)
                rosdef_angle = degrees_0;
        else if (angle <= 30.0)
                rosdef_angle = degrees_15;
        else if (angle <= 60.0)
                rosdef_angle = degrees_45;
        else if (angle <= 82.5)
                rosdef_angle = degrees_75;
        else
                rosdef_angle = degrees_0;

*abmsex_index = (s32)rosdef_angle +
                                        ((rosdef_angle == degrees_0) ?
                                                yellow_ruling_ratio : 0);

if (ruling <= 1E-10 * res)
                target_pixels_per_spot = 1E10;
        else
                target_pixels_per_spot = res / ruling;

best_abmsex = abmsex_tab;
        best_error = fabs(best_abmsex->pixels_per_spot - target_pixels_per_spot);
```

Professional Software Technologies, Inc. © Copyright 1995
```
        ptr = (u8 *)scdata_buffer;

while (*ptr != NUL)
        {
                if ((ptr[0] == '%') &&
                        (ptr[1] == '%') &&
                        (!strncmp(name, &(ptr[2]), name_len)))
                {
                        ptr += name_len + 2;

if ((*ptr == CR) || (*ptr == LF))
                        {
                                ptr++;

while ((*ptr == CR) || (*ptr == LF))
                                        ptr++;

return ptr;
                        }
                } while ((*ptr != CR) && (*ptr != LF) && (*ptr != NUL))
                        ptr++;

while ((*ptr == CR) || (*ptr == LF))
                        ptr++;

} return NULL;
}

BOOL find_next_line_in_section(ptr_ptr)
u8 **ptr_ptr;
{
        register u8 *ptr = *ptr_ptr;

while ((*ptr != NUL) && (*ptr != CR) && (*ptr != LF))
                ptr++;

while ((*ptr == CR) || (*ptr == LF))
                ptr++;

*ptr_ptr = ptr;

if ((*ptr == NUL) ||
                ((ptr[0] == '%') && (ptr[1] == '%')))
        {
                return FALSE;
        }
        else
        {
                return TRUE;
        }
} s32 scdata_section_len(name)
u8 *name;
{
        register s32            section_len;
        u8      *ptr;
```

C 54

Professional Software Technologies, Inc. © Copyright 1995

}

```c
encrypt(data, data_len, screenid)
u8 *data;
s32 data_len, screenid;
{
    register s32        i, j;
    register u8         *p, *m, *mm;
    static u8   code1[32] = {128+23,14,32,128+73,62,128+57,44,12,34,128+31,
72,14,128+37,128+13,128+39,128+61,128+63,128+97,
                                128+49,128+85,128+59,128+39,84,38,24,
                                128+97,128+63,128+33,28,56,12,128+93};
    static u8   code2[32] = {14,32,128+73,62,128+57,44,12,34,128+31,
72,14,128+37,128+13,128+39,128+61,128+63,128+97,
                                128+49,128+85,128+59,128+39,84,38,24,
128+97,128+63,128+33,28,56,12,128+93,128+23};

if (screenid < DBASE*DBASE/2)
        return;
    else
        mm = code2;

#ifdef DEBUG
    if (screen_debug & SCREEN_DEBUG_SETSCREEN_FILE)
    {
        fprintf(stderr, "SCREEN_DEBUG_SETSCREEN_FILE\n");
        fprintf(stderr, "Decrypting\n");
    }
endif i = data_len;
    p = data;
    j = 32;
    m = mm;

while (i-- != 0)
    {
        *p++ ^= *m++;

if (--j == 0)
        {
            j = 32;
            m = mm;
        }
    } return;
} u8 *find_section_header(name)
u8 *name;
{
    register u8     *ptr;
    s32             name_len;

name_len = strlen(name);
```

Professional Software Technologies, Inc. © Copyright 1995

```c
static ABMSEX_TAB *abmsex_tab=NULL, *abmsex_offset_tab=NULL;
static s32 *fma_tab=NULL, *fmm_tab=NULL;
static u8 *scdata_buffer=NULL;

typedef enum
{
      degrees_15,
      degrees_45,
      degrees_75,
      degrees_0
} ROSDEF_ANGLE;

char *to_base(val,result)
s32 val;
char *result;
{
      static char *baseconv =
            "0123456789abcdefghijklmnopqrstuvwxyz$#&@!%()-{}_'`^~";
      s32 num;

val %= (DBASE*DBASE*DBASE);
      num = val/(DBASE*DBASE);
      val -= num*(DBASE*DBASE);
      result[0] = baseconv[num];
      num = val/DBASE;
      val -= num*DBASE;
      result[1] = baseconv[num];
      result[2] = baseconv[val];
      result[3] = NUL;
      return(result);
} char *to_base_dot(val, result)
s32 val;
char *result;
{
      static char *baseconv1 =
            "sabcdefghijklmnopqrtuvwxyz0123456789$#&@!%()-{}_'`^~";
      static char *baseconv2 =
            "abcdefghijklmnopqrstuvwxyz0123456789$#&@!%()-{}_'`^~";
      s32 num;

val %= DBASE*DBASE;
      num = val/DBASE;
      val %= DBASE;
      result[0] = baseconv1[num];
      result[1] = baseconv2[val];
      result[2] = NUL;
      return(result);
} make_dotdir_name(aa,bb,mm,ss,string,ripdir)
s32    aa,bb,mm,ss;
u8 *string,*ripdir;
{
      u8 d[3],a[4],b[4],m[4];

sprintf(string,"%s/dotdir/%s%s%s.%s",ripdir,
            to_base_dot(ss,d),
            to_base(aa,a),
            to_base(bb,b),
            to_base(mm,m));
```

Professional Software Technologies, Inc. © Copyright 1995

```c
#include "all.h"
include <math.h> include "screen.h"

if DEBUG
#include "screen_debug.h"
int screen_debug = 0;
endif define DBASE               52
define    MAX_DOT_NUMBER   (DBASE*DBASE-1)

#define GSTR(x,y) (y)
#define warning(x) fputs(x,stderr)
#define get_mem(x,y) malloc(x)

#define f_zero ((double)0.0)

#define    RD_CLASS    0
#define    RDO_CLASS   1
define FM_CLASS   2 define YRR_LOW       0
define    YRR_MED         1
define YRR_HIGH   2 typedef struct
{
        s32 a,b,m;
        s32 width,depth;
        s32 area,stagger;
} BRICK;

typedef struct
{
        BRICK           brick;
        u8              *data;
        scrDotTable     my_DotTable;
        s32                 yellow_ruling_ratio;
        s32                 fm_scale;
        BOOL            flip;
        BOOL            dot_centred;
        char            ripdir[128];
} Hidden;

typedef struct
{
        u8      scdata_location[128];
        u8      dotdir_location[128];
} scrGlobal;

typedef struct
{
        s32 a[6], b[6], m[6];
        float pixels_per_spot;
} ABMSEX_TAB;
```

Professional Software Technologies, Inc. © Copyright 1995

```
            DotTable->dot_name[s_class]=NULL;
        }
    } if(DotTable->num_in_class!=NULL)
    {
        free(DotTable->num_in_class);
        DotTable->num_in_class=NULL;
    } return scrErr_OK;
}
```

C 58

Professional Software Technologies, Inc. © Copyright 1995

```
                b=abm->b[abm_index];
                m=abm->m[abm_index];
                dot_index=(dot.num *2) + 4 +
                                        ((hidden->dot_centred && (abm_index ==
degrees_45)) ? 1 : 0);
                comment_sought=comment2;
                break;
        case FM_CLASS:
                a=fma_tab[dot.num];
                b=0;
                m=fmm_tab[dot.num];

dot_index=dot.num * 4;
                if(ang < 7.5)
                        dot_index+=3;
                else if(ang < 30.0)
                        dot_index+=1;
                else if(ang < 60.0)
                        dot_index+=0;
                else if(ang < 82.5)
                        dot_index+=2;
                else
                        dot_index+=3;

dot_index = MAX_DOT_NUMBER - dot_index;
                comment_sought=comment3;
                break;
        default:
                return scrErr_BadSetscreen;
    } make_dotdir_name(a,b,m,dot_index,filename,hidden->ripdir);
    strcat(filename,"/screen.fil");

#ifdef DEBUG
    if (screen_debug & SCREEN_DEBUG_SETSCREEN_FILE)
    {
        fprintf(stderr, "SCREEN_DEBUG_SETSCREEN_FILE\n");
        fprintf(stderr, "d:%d a:%d b:%d m:%d\n", dot_index, a, b, m);
        fprintf(stderr, "File %s\n", filename);
    }
endif fp=fopen(filename,"r");
    if(fp==NULL)
            return scrErr_BadDotData;
    if(fread(&brick,sizeof(brick),1,fp) == 0)
    {
            fclose(fp);
            return scrErr_BadDotData;
    }
    if(brick.a != a || brick.b!=b || brick.m!=m)
    {
            fclose(fp);
            return scrErr_BadDotData;
    } if(fread(&tint,sizeof(tint),1,fp) == 0)
    {
            fclose(fp);
            return scrErr_BadDotData;
    }
```

C 59

Professional Software Technologies, Inc. © Copyright 1995

```
    temp_brick=(u8 *)malloc(brick.area * (dot.s_class==FM_CLASS ? hidden-
>fm_scale*hidden->fm_scale : 1));
    if(temp_brick==NULL)
    {
        fclose(fp);
        return scrErr_NoMemory;
    } if(fread(temp_brick,1,brick.area,fp) == 0)
    {
        free(temp_brick);
        fclose(fp);
        return scrErr_BadDotData;
    } encrypt(temp_brick, brick.area, dot_index);

for(ptr=comment_block ; (bytes_read=fread(ptr,1,80,fp)) > 0 ; ptr+=bytes_read)
        ;

*ptr=NUL;

fclose(fp);
    comment_ok=NO;
    first = *comment_sought;
    for(cmt = comment_block ; *cmt != NUL ; cmt++)
    {
        if(*cmt == first &&
            strncmp(cmt,comment_sought, strlen(comment_sought)) == 0)
        {
            comment_ok = TRUE;
            break;
        }
    }
    if(!comment_ok)
        return scrErr_BadDotData;

if ((dot.s_class == FM_CLASS) && (hidden->fm_scale != 1))
    {
        s32 scale = hidden->fm_scale;
        s32 i, j;

for(j=brick.depth-1; j>=0; j--)
        {
            for(i=brick.width-1; i>=0; i--)
            {
                u8 val = temp_brick[j*brick.width+i];
                s32 i1, j1;

for(j1=scale-1; j1>=0; j1--)
                {
                    for(i1=scale-1; i1>=0; i1--)
                    {
temp_brick[(j*scale+j1)*(brick.width*scale)+(i*scale+i1)] = val;
```

C 60

Professional Software Technologies, Inc. © Copyright 1995

```
                        }
                    }
                )
            } brick.a *= scale;
            brick.b *= scale;
            brick.m *= scale;
            brick.depth *= scale;
            brick.width *= scale;
            brick.stagger *= scale;
            brick.area *= scale*scale;
    } if (hidden->flip)
    {
        s32 j;

nfor(j, 0, brick.depth)
        {
            u8 *p1, *p2;
            s32 i;

p1 = temp_brick+(j*brick.width);
            p2 = temp_brick+(j*brick.width+(brick.width-1));

loop(i, brick.width/2)
            {
                u8 val;

val = *p1;
                *p1++ = *p2;
                *p2-- = val;
            }
        } if (brick.stagger != 0)
            brick.stagger = brick.width - brick.stagger;
    } hidden->brick=brick;                    /*STRUCT assignment */
    if(hidden->data != NULL)
    {
        free(hidden->data);
        hidden->data=NULL;
    }
    hidden->data=temp_brick;

#ifdef DEBUG
    if (screen_debug & SCREEN_DEBUG_SETSCREEN_DATA)
    {
        int i, j, sum;

fprintf(stderr, "SCREEN_DEBUG_SETSCREEN_DATA\n");

sum = 0;
        nfor(i, 0, brick.area)
        {
            sum += hidden->data[i];
            sum %= 100000;
```

Professional Software Technologies, Inc. © Copyright 1995

```
            }
            fprintf(stderr, "Checksum %d\n", sum);

fprintf(stderr, "Data at %X\n", hidden->data);

nfor(j, 0, 16)
            {
                nfor(i, 0, 16)
                    fprintf(stderr, "%02X ", hidden->data[j*16+i]);
                fprintf(stderr, "\n");
            }
    }
endif return scrErr_OK;

} scrErr ScreenBlock(Control)
scrControl *Control;
{
    register unsigned char *s, *d, *p;
    register long x, y, i, j, k, x1, words_per_line;
    register unsigned long mask, out;
#ifdef DEBUG
    register unsigned char dmax, dmin;
#endif
    Hidden *stat = (Hidden *)(Control->forHyphenUse);

#ifdef DEBUG
    if (screen_debug & SCREEN_DEBUG_SCREENBLOCK_THRESHOLD_DATA)
    {
        register int i, j, sum;

fprintf(stderr, "SCREEN_DEBUG_SCREENBLOCK_THRESHOLD_DATA\n");

sum = 0;
        nfor(i, 0, stat->brick.area)
        {
            sum += stat->data[i];
            sum %= 100000;
        } fprintf(stderr, "Checksum %d\n", sum);

fprintf(stderr, "Threshold data at %X\n", stat->data);
        nfor(j, 0, 16)
        {
            nfor(i, 0, 16)
                fprintf(stderr, "%02X ", stat->data[j*16+i]);
            fprintf(stderr, "\n");
        }
    } if (screen_debug & SCREEN_DEBUG_SCREENBLOCK_CONTONE_DATA)
    {
        register int i, j;
```

Professional Software Technologies, Inc. © Copyright 1995

```
            fprintf(stderr, "SCREEN_DEBUG_SCREENBLOCK_CONTONE_DATA\n");
            fprintf(stderr, "Contone data at %X\n", Control->dataPtr);
            nfor(j, 0, 16)
            {
                    nfor(i, 0, 16)
                            fprintf(stderr, "%02X ", Control->dataPtr[j*16+i]);
                    fprintf(stderr, "\n");
            }
    }
endif if ((Control->location->top > Control->location->bottom) ||
            (Control->location->left > Control->location->right) ||
            ((Control->location->right-Control->location->left+1) % 32 != 0))
                return scrErr_BadRect;

y = Control->location->top % stat->brick.depth;
        if (y < 0)
                y += stat->brick.depth;

x = Control->location->left -
                        ((Control->location->top / stat->brick.depth) * stat->brick.stagger);
        x %= stat->brick.width;
        if (x < 0)
                x += stat->brick.width;

s = stat->data + (y * stat->brick.width + x);

x1 = stat->brick.width - x;

words_per_line = (Control->location->right-Control->location->left+1) / 32;

d = p = Control->dataPtr;

#ifdef DEBUG
        dmin = 255;
        dmax = 0;
        if (screen_debug & SCREEN_DEBUG_SCREENBLOCK_OUTPUT_DATA)
                fprintf(stderr, "SCREEN_DEBUG_SCREENBLOCK_OUTPUT_DATA\n");
endif if (Control->positive)
        {
                for (j = Control->location->bottom-Control->location->top+1;
                     j != 0;
                     j--)
                {
                        for (i = words_per_line; i != 0; i--)
                        {
                                mask = 1 << 31;
                                out = 0;

for (k = 32; k != 0; k--)
                                {
#ifdef DEBUG
                                        if (*d < dmin)
                                                dmin = *d;
                                        if (*d > dmax)
                                                dmax = *d;
#endif
```

Professional Software Technologies, Inc. © Copyright 1995

```
                                if (*d++ >= *s++)
                                {
#ifdef DEBUG
                                    if ((screen_debug & SCREEN_DEBUG_SCREENBLOCK_OUTPUT_DATA) &&
                                        (j <= 32) &&
                                        (i == 1))
                                                    fprintf(stderr, "1");
#endif
                                    out |= mask;
                                }
#ifdef DEBUG
                                else
                                {
                                    if ((screen_debug & SCREEN_DEBUG_SCREENBLOCK_OUTPUT_DATA) &&
                                        (j <= 32) &&
                                        (i == 1))
                                                    fprintf(stderr, "0");
                                }
endif mask >>= 1;

if (--x1 == 0)
                                {
                                    x1 = stat->brick.width;
                                    s -= stat->brick.width;
                                }
                            }
#ifdef DEBUG
                            if ((screen_debug & SCREEN_DEBUG_SCREENBLOCK_OUTPUT_DATA) &&
                                (j <= 32) &&
                                (i == 1))
                                                    fprintf(stderr, "\n");
#endif

*p++ = out >> 24;
                            *p++ = (out >> 16) & 0xFF;
                            *p++ = (out >> 8) & 0xFF;
                            *p++ = out & 0xFF;
                        } if (++y == stat->brick.depth)
                        {
                            y = 0;
                            x -= stat->brick.stagger;
                            if (x < 0)
                                x += stat->brick.width;
                        } s = stat->data + (y * stat->brick.width + x);

x1 = stat->brick.width - x;
                    }
                }
                else
                {
                    for (j = Control->location->bottom-Control->location->top+1;
                         j != 0;
                         j--)
                    {
                        for (i = words_per_line; i != 0; i--)
                        {
```

C 64

Professional Software Technologies, Inc. © Copyright 1995

```
                    mask = 1 << 31;
                    out = 0;

for (k = 32; k != 0; k--)
                    {
#ifdef DEBUG
                            if (*d < dmin)
                                    dmin = *d;
                            if (*d > dmax)
                                    dmax = *d;
#endif
                            if (*d++ < *s++)
                            {
#ifdef DEBUG
                        if ((screen_debug & SCREEN_DEBUG_SCREENBLOCK_OUTPUT_DATA) &&
                            (j <= 32) &&
                            (i == 1))
                                            fprintf(stderr, "1");
#endif
                                    out |= mask;
                            }
#ifdef DEBUG
                            else
                            {
                        if ((screen_debug & SCREEN_DEBUG_SCREENBLOCK_OUTPUT_DATA) &&
                            (j <= 32) &&
                            (i == 1))
                                            fprintf(stderr, "0");
                            }
endif mask >>= 1;

if (--x1 == 0)
                            {
                                    x1 = stat->brick.width;
                                    s -= stat->brick.width;
                            }
                    }
#ifdef DEBUG
                        if ((screen_debug & SCREEN_DEBUG_SCREENBLOCK_OUTPUT_DATA) &&
                            (j <= 32) &&
                            (i == 1))
                                            fprintf(stderr, "\n");
#endif

*p++ = out >> 24;
                    *p++ = (out >> 16) & 0xFF;
                    *p++ = (out >> 8) & 0xFF;
                    *p++ = out & 0xFF;
            } if (++y == stat->brick.depth)
            {
                    y = 0;
                    x -= stat->brick.stagger;
                    if (x < 0)
                            x += stat->brick.width;
            } s = stat->data + (y * stat->brick.width + x);
```

C 65

Professional Software Technologies, Inc. © Copyright 1995

```
                x1 = stat->brick.width - x;
        }
    }
#ifdef DEBUG
    if (screen_debug & SCREEN_DEBUG_SCREENBLOCK_CONTONE_DATA)
    {
        fprintf(stderr, "SCREEN_DEBUG_SCREENBLOCK_CONTONE_DATA\n");
        fprintf(stderr, "Min %02X max %02X\n", dmin, dmax);
    }
endif words_per_line * 4;

return scrErr_OK;
} scrErr EndScreening(Control, DotTable)
scrControl *Control;
scrDotTable *DotTable;
{
    register s32        s_class, num;
    Hidden      *hidden = (Hidden *)(Control->forHyphenUse);

if(hidden!=NULL)
    {
        if(hidden->data!=NULL)
        {
            free(hidden->data);
            hidden->data=NULL;
        }
        free(hidden);
        hidden=NULL;
    } nfor(s_class,0,DotTable->class_max)
    {
        nfor(num,0,DotTable->num_in_class[s_class])
        {
            if(DotTable->dot_name[s_class][num]!=NULL)
            {
                free(DotTable->dot_name[s_class][num]);
                DotTable->dot_name[s_class][num]=NULL;
            }
        }
        if(DotTable->dot_name[s_class]!=NULL)
        {
            free(DotTable->dot_name[s_class]);
            DotTable->dot_name[s_class]=NULL;
        }
    } if(DotTable->num_in_class!=NULL)
    {
        free(DotTable->num_in_class);
        DotTable->num_in_class=NULL;
    }
```

C 66

Professional Software Technologies, Inc. © Copyright 1995
    return scrErr_OK;
}

Professional Software Technologies, Inc. © Copyright 1995
static char sccsid[]="%W%    %G% %U%    %Q% %Y%";

```c
define __main__ define USE_TEMPLATE include <iostream.h>
include "scrn_it.h"
#include <GetOpt.h>
#include <Logger.h>
#include "processor.h"
#include "task.h"
#include "scrnpst.h"
#include "scrnbit.h"
#include "mscrnbit.h"

#include "bmfile.h"
#include "psfile.h"
#include "tiffile.h"

#ifndef USE_TEMPLATE
#include "pstscrnbit.h"
#include "pstscrntiff.h"
#include "pstscrnps.h"
endif // USE_TEMPLATE define SHOW_PS

ScrnItApp::ScrnItApp()
{
      // log = new WLogger("scrn_it.log", 1);
      // log = new WLogger("/dev/ttyq4", 1);
      // log = new WLogger("/dev/tty", 1);
      // log = new WLogger("/dev/console", 1);
      log = new WLogger;

#if 0
      if (0)
      {
            FILE* fp=::fopen("scrn_it.log", "a");
            // log = new WLogger(fp, 1);
            log = new WLogger(fileno(fp), 1);
      }
#endif // 0 or 1

// log = new WLogger("4d35", 7, 1, 1);
      // log = new WLogger("4d35", 5678, 1, 1);
}

ScrnItApp::~ScrnItApp()
{
      delete log;
} void ScrnItApp::parse_args()
{
      GetOpt getopt(argc, argv, "ahc:vtpDBPS:F:lL");
```

C 68

Professional Software Technologies, Inc. © Copyright 1995

```
    int NArg = 2;
    int err_flag = 0;
    int print_help = 0;

// default option
    inputOpt.set(inpsti);
    scrnItOpt.set(screen_it);
    outputOpt.set(psti);
    tiffOutOpt.set(tile);
    chanel = 0;
    auto_input = 1;
    auto_position = 0;

while (1)
    {
        int ch;

if ((ch = getopt()) == EOF)
            break;

char c = char(ch);
        switch (c)
        {
            case 'h':
                print_help = 1;
                break;
            case 'v':
                miscOpt.set(verbose);
                break;
            case 'D':
                miscOpt.set(debug);
                break;
            case 'c':
                chanel = atoi(getopt.optarg);
                break;
            case 't':
                inputOpt.set(tpf);
                auto_input=0;
                break;
            case 'p':
                inputOpt.set(inpsti);
                auto_input=0;
                break;
            case 'B':
                outputOpt.set(bitmap);
                break;
            case 'P':
                outputOpt.set(psti);
                break;
            case 'S':
                outputOpt.set(postscript);
                int ps_format = atoi(getopt.optarg);
                if (ps_format==1)
                    psOutOpt.set(postscript_bin);
                else
                    psOutOpt.set(postscript_hex);
                break;
            case 'a':
                auto_position=1;
                break;
            case 'F':
```

C 69

Professional Software Technologies, Inc. © Copyright 1995

```
                        int tiff_format = atoi(getopt.optarg);
                        if ((tiff_format>=tiff_none) && (tiff_format<=tiff_fax4))
                                outputOpt.set(tiff_format);
                        break;
                case 'l':
                        tiffOutOpt.set(scanline);
                        break;
                case 'L':
                        tiffOutOpt.set(tile);
                        break;
                case '?':
                        err_flag++;
                        break;
                default:
                        char mesg[255];
                        sprintf(mesg, "getopt returned character code %c.", c);
                        info(mesg);
                }
        }

// if (argc-getopt.optind<NArg)
        if (argc-getopt.optind>NArg)
        {
                // if (argc<NArg)
                if (argc>NArg)
                        info("illegal number of arguments");
                err_flag++;
        } if (print_help || err_flag)
        {
                cerr << "Usage:" << endl;
                cerr << "\t" << name;
                cerr << " [ -c chanel ] [ -avtphDBPlL ] [ -F TIFF compression ]"
                        " [ [ input ] output ]";
                cerr << endl;

cerr << "    -h    print this help message" << endl;
                cerr << "    -t    input TP file" << endl;
                cerr << "    -p    input PSTI file (default)" << endl;
                cerr << "    -c    specify input PSTI chanel to read" << endl;
                cerr << "    -B    output Hyphen BitMap file" << endl;
                cerr << "    -P    output PSTI file (default)" << endl;
#ifdef SHOW_PS
                cerr << "    -S n  output PostScript where n spcifies data format" <<
endl;
                cerr << "          0    hex data" << endl;
                cerr << "          1    binary data" << endl;
                cerr << "    -a    automatically position the output PostScript" << endl;
#endif // SHOW_PS
                cerr << "    -F n  output TIFF where n specifies the compression" <<
endl;
                cerr << "          0    non-compressed" << endl;
                cerr << "          1    Macintosh packetbits compression" << endl;
                cerr << "          2    LZW compression" << endl;
                cerr << "          3    CCITT group 3 fax encoding" << endl;
                cerr << "          4    CCITT group 4 fax encoding" << endl;
                // cerr << "          5    JPEG compression" << endl;
                // cerr << "          6    CCITT modified Huffman RLE" << endl;
                // cerr << "          7    CCITT modified Huffman RLE with word
alignment compression" << endl;
                // cerr << "          8    NeXT 2-bit RLE compression" << endl;
```

C 70

Professional Software Technologies, Inc. © Copyright 1995

```
        // cerr << "          9    ThunderScan RLE compression" << endl;
        cerr << "   -l    specify scanline file when TIFF output" << endl;
        cerr << "   -L    specify tile file when TIFF output (default)" << endl;
        cerr << "   -D    turn on debugging" << endl;
        cerr << "   -v    verbose" << endl;
        cerr << endl;

if (!print_help)
                exit(1);
        else
                exit(0);
    } switch (argc-getopt.optind)
    {
        case 0:
                strcpy(infile, "-");
                strcpy(outfile, "-");
                auto_input = 0;
                break;
        case 1:
                strcpy(infile, "-");
                outfile = argv[getopt.optind++];
                auto_input = 0;
                break;
        case 2:
                infile = argv[getopt.optind++];
                outfile = argv[getopt.optind++];
                break;
    }
} void ScrnItApp::central()
{
    Processor* processor;

#ifndef USE_TEMPLATE
        if (outputOpt.get(psti))
                processor = new ScrnPst(infile, outfile);
        else if (outputOpt.get(bitmap))
                processor = new PstScrnBit(infile, outfile);
        else if (outputOpt.get(tiff_none) || outputOpt.get(tiff_packetbits) ||
                 outputOpt.get(tiff_lzw) || outputOpt.get(tiff_fax3) ||
                 outputOpt.get(tiff_fax4) || outputOpt.get(tiff_jpeg) ||
                 outputOpt.get(tiff_rle) || outputOpt.get(tiff_rlew) ||
                 outputOpt.get(tiff_next) || outputOpt.get(tiff_thunderscan))
                processor = new PstScrnTiff(infile, outfile);
        else if (outputOpt.get(postscript))
                processor = new PstScrnPs(infile, outfile);
#else
        if (outputOpt.get(psti))
                processor = new ScrnPst(infile, outfile);
        else if (outputOpt.get(bitmap))
                processor =
                        new ScrnBit<iPst, oBmFile, PtoBit8, NoopExport, Screening, 1|128,
0>
                        (infile, outfile);
        else if (outputOpt.get(tiff_none) || outputOpt.get(tiff_packetbits) ||
                 outputOpt.get(tiff_lzw) || outputOpt.get(tiff_fax3) ||
                 outputOpt.get(tiff_fax4) || outputOpt.get(tiff_jpeg) ||
```

Professional Software Technologies, Inc. © Copyright 1995

```
                    outputOpt.get(tiff_rle) || outputOpt.get(tiff_rlew) ||
                    outputOpt.get(tiff_next) || outputOpt.get(tiff_thunderscan))
            processor =
                    new ScrnBit<iPst, oTifFile, PtoBit8, NoopExport, Screening, 3,0>
                    (infile, outfile);
        else if (outputOpt.get(postscript))
        {
                if (psOutOpt.get(postscript_bin))
                  processor =
                    new ScrnBit<iPst, oBinBmPsFile, PtoBit8, NoopExport,
Screening,3,1>
                    (infile, outfile);
                else
                  processor =
                    new MScrnBit<iPst, oHexBmPsFile, PtoBit8, NoopExport,
MScreening,3,1>
                    (infile, outfile);
        }
endif // USE_TEMPLATE processor->process();

delete processor;

if (miscOpt.get(verbose))
                scrnIt.info("complete");
} void ScrnItApp::processing(long cur_line, long total_line) const
{
        char mesg[255];
        sprintf(mesg, "processing line %5d\t%3d%% processed",
                    cur_line, 100*cur_line/total_line);

scrnIt.info(mesg);
}
```

What is claimed is:

1. A process for frequency modulated screening of desktop publisher image data values for flexo-press printer apparatus which has input gain compensation affected by ambient factors data, comprising the steps of:

obtaining equipment factors as a function of the ambient factors data for the particular flexo-press printer apparatus being operated, and obtaining the image data values and flexo-press data received from a desktop publisher and the ambient factors data received from the flexo-press printer apparatus, said obtaining equipment factors step including calibrating said flexo-press data as a function of said ambient factors data;

generating an interpreter language having a number of words numbering x times the number of possible said image data values provided by said desktop publisher, said interpreter language generation being modified as a function of said calibrated flexo-press data;

interpreting the image data values based upon the calibrated flexo-press data and said interpreter language generated; and outputing said interpreted image data values to said flexo-press printer apparatus.

2. The process of claim 1 wherein the step of obtaining equipment factors includes the steps of:

obtaining image setter and press selection data from said desktop publisher; and obtaining said ambient factors data about the image setter and press.

3. The process of claim 2 wherein the step of generating an interpreter language includes the steps of:

stochastically generating words being graphic building tiles for an interpreter language;

storing a base tile and a tile library definition data;

determining the number of words in the interpreter language; and generating a specific interpreter language from said base tile stored, said tile library definition data and selected number of words tiles for said language.

4. The process of claim 3 wherein said generating said specific interpreter language step includes adjusting the words tiles values as a function of said image setter and press selection data obtained.

5. The process of claim 4 wherein said generating said specific interpreter language step includes further adjusting said words tiles values as a function of said ambient factors data obtained.

6. The process of claim 5 wherein said storing said base tile and said tile library definition data includes the step of compressing said title library definition data when writing it into hard storage; and the step of decompressing said tile library definition data when reading it from said hard storage.

7. The process of claim 4 wherein the step of translating the image data values includes substituting said tiles values from the interpreter language generated for each pixel of image data values.

8. The process of claim 7 wherein the number of possible image data values for each image pixel is 256.

9. The process of claim 8 wherein the number of said words tiles in the specific interpreter language generated is 1000 times n, where n is selected from the group of numbers one to 10.

10. An apparatus for frequency modulation screening, for operating a flexo-press printer at increased tonal range output, said apparatus being positioned between a desktop publisher and an image setter of a flexo-press printer, said apparatus providing gain compensation of said flexo-press printer operation affected by ambient factors by adjusting the image setter input signals, comprising:

a calibration interface circuit connected to said desktop publisher for receiving and encoding flexo-press data as a function of said ambient factors;

an interpreter processor unit for generating an expanded set of image setter instructions as a function of said encoded flexo-press data received from said calibration interface circuit, and for interpreting image data received from said desktop publisher;

a data storage device connected to said interpreter processor unit and containing instructions for said interpreter processor unit operation; and an output of said interpreter processor unit connected to the input of said image setter of said flexo-press printer;

wherein said interpreter processor unit operates in an interpreter mode translating said image data into substitute values factored upon said ambient factors and said flexo-press data.

11. The apparatus of claim 10 wherein said calibration interface circuit is connected to said desktop publisher and said flexo-press printer.

12. The apparatus of claim 11 wherein said calibration interface circuit includes software for providing calibration data output based upon the flexo-press printer selection information from said desktop publisher and the ambient factors information from said flexo-press printer.

13. The apparatus of claim 12 wherein said data storage device is a hard disk drive contained within said interpreter processor unit.

14. The apparatus of claim 13 wherein said interpreter processor unit contains software for generating a base language word and for storing the base language word in compressed form in said hard disk drive.

15. The apparatus of claim 14 wherein said interpreter processor unit also contains software for generating a language specific to the immediate translation as a function of said calibration data output received from said calibration interface circuit.

16. The apparatus of claim 14 wherein said interpreter processor unit further contains software for translating said image data received from said desktop publisher by language substitution whereof the translated image data information is sent to said interpreter processor unit output.

17. The apparatus of claim 10 wherein said interpreter processor unit is implemented in software contained within a process control station being a Sun Microsystems SPARC station.

18. The apparatus of claim 17 wherein said calibration interface circuit is implemented by software contained in buffer register storage within said desktop publisher.

19. The apparatus of claim 18 wherein said data storage device is a dedicated external hard disk drive connected to said SPARC station.

20. The apparatus of claim 19 wherein said flexo-press data is received from a desktop publisher keyboard entry; and also including the desktop publisher keyboard entry of said ambient factors data.

* * * * *